(12) United States Patent
Park et al.

(10) Patent No.: US 11,501,409 B2
(45) Date of Patent: Nov. 15, 2022

(54) ELECTRONIC DEVICE FOR IMAGE SYNTHESIS AND OPERATING METHOD THEREOF

(71) Applicant: Samsung Electronics Co., Ltd., Gyeonggi-do (KR)

(72) Inventors: Sangmin Park, Gyeonggi-do (KR); Jaeyung Yeo, Gyeonggi-do (KR)

(73) Assignee: Samsung Electronics Co., Ltd

( * ) Notice: Subject to any disclaimer, the term of this patent is extended or adjusted under 35 U.S.C. 154(b) by 44 days.

(21) Appl. No.: 17/014,406

(22) Filed: Sep. 8, 2020

(65) Prior Publication Data

US 2021/0073943 A1    Mar. 11, 2021

(30) Foreign Application Priority Data

Sep. 6, 2019    (KR) ........................ 10-2019-0110874

(51) Int. Cl.
*G06T 3/40*    (2006.01)
*G06T 5/50*    (2006.01)
(Continued)

(52) U.S. Cl.
CPC .............. *G06T 3/4038* (2013.01); *G06T 5/50* (2013.01); *G06T 7/0002* (2013.01); *G06T 7/70* (2017.01);
(Continued)

(58) Field of Classification Search
CPC ....... G06T 3/4038; G06T 5/50; G06T 7/0002; G06T 7/70; G06T 11/60; G06T 2207/20221
(Continued)

(56) References Cited

U.S. PATENT DOCUMENTS

2003/0190089 A1* 10/2003 Katsuda .................. G06T 11/60
382/284
2004/0021775 A1* 2/2004 Kondo ...................... G06T 7/20
348/207.99
(Continued)

FOREIGN PATENT DOCUMENTS

KR    1020120087432    8/2012
KR    10-1450580    10/2014
(Continued)

OTHER PUBLICATIONS

Google, "Deep Learning Object Detection Terminology", https://light-tree.tistory.com/75, Sep. 21, 2018, 9 pages.
Cognex, "Overview of Image Recognition Problems: Focusing on the PASCAL VOC Challenge", Cognex Deep Learning Lab—KOR Research Blog, Nov. 29, 2017, 17 pages.
(Continued)

*Primary Examiner* — Ayodeji O Ayotunde
(74) *Attorney, Agent, or Firm* — The Farrell Law Firm, P.C.

(57) ABSTRACT

An electronic device for synthesizing an image, and an operating method thereof, are provided. The electronic device may include a display, a processor operatively coupled to the display, and a memory operatively coupled to the processor, wherein the memory may store instructions, which when executed, cause the processor to identify at least one target object in a first image, and at least one background object in a second image, determine a position for arranging the at least one target object on the second image, based on correlation of the at least one identified target object and the at least one identified background object, obtain a third image by arranging the at least one target object based on the determined position on the second image, and display the obtained third image on the display.

20 Claims, 18 Drawing Sheets

(51) Int. Cl.
  *G06T 7/00* (2017.01)
  *G06T 11/60* (2006.01)
  *G06T 7/70* (2017.01)

(52) U.S. Cl.
  CPC .... *G06T 11/60* (2013.01); *G06T 2207/20221* (2013.01)

(58) Field of Classification Search
  USPC ......................................................... 382/100
  See application file for complete search history.

(56) References Cited

U.S. PATENT DOCUMENTS

| | | |
|---|---|---|
| 2005/0225566 A1 | 10/2005 | Kojo |
| 2010/0124941 A1 | 5/2010 | Cho |
| 2010/0253763 A1* | 10/2010 | Shioya ............. H04N 5/225251 348/36 |
| 2014/0112598 A1 | 4/2014 | Yamashita et al. |
| 2014/0267435 A1 | 9/2014 | Choe et al. |
| 2014/0333818 A1 | 11/2014 | Sohn et al. |
| 2019/0058836 A1 | 2/2019 | Lee et al. |
| 2019/0251237 A1 | 8/2019 | Park et al. |

FOREIGN PATENT DOCUMENTS

| | | |
|---|---|---|
| KR | 1020140132568 | 11/2014 |
| KR | 1020190066384 | 6/2019 |

OTHER PUBLICATIONS

Dhruv Parthasarathy, "A Brief History of CNNs in Image Segmentation: From R-CNN to Mask R-CNN", Apr. 23, 2017, 19 pages.
Ross Girshick et al., Rich Feature Hierarchies for Accurate Object Detection and Semantic Segmentation Tech Report (v5), Oct. 22, 2014, 21 pages.
Ross Girshick, "Fast R-CNN", Microsoft Research, Sep. 27, 2015, 9 pages.
Shaoqing Ren et al., "Faster R-CNN: Towards Real-Time Object Detection with Region Proposal Networks", Jan. 6, 2016, 14 pages.
Kaiming He et al., "Mask R-CNN", Facebook AI Research (FAIR), Jan. 24, 2018, 12 pages.
Beomsu Kim, "Theorem Related to Word2Vec", Shuuki 4 in Deep Learning, Jan. 27, 2016, 23 pages.
Dreamgonfly's Blog, "Easy Written Word2Vec", https://dreamgonfly.github.io/blog/word2vec-explained/, Aug. 16, 2017, 29 pages.
The Missing Papers, "BERT Showdown", https://docslikejazz.com/bert/, Dec. 17, 2018, 45 pages.
Reporter Park Hyun-Jin, "What is the Artificial Intelligence (AI) Language Model'BERT", Image:Google, http://www.aitimes.kr/news/articleView.html?idxno=13117, 2019, 7 pages.
Hulk's Personal Study Blog, "Attention Mechanism", https://hulk89.github.io/neuralmachine translation/2017/04/04/attention-mechanism/, Apr. 4, 2017, 24 pages.
YouTube, "Attention Mechanism", https://www.youtube.com/watch?v=6aouXD8WMVQ, 10min Deep Learning, Oct. 4, 2018, 1 page.
International Search Report dated Dec. 21, 2020 issued in counterpart application No. PCT/KR2020/011920, 7 pages.

* cited by examiner

ELECTRONIC DEVICE FOR IMAGE SYNTHESIS AND OPERATING METHOD THEREOF

CROSS-REFERENCE TO RELATED APPLICATION(S)

This application is based on and claims priority under 35 U.S.C. § 119 to Korean Patent Application No. 10-2019-0110874, filed on Sep. 6, 2019, in the Korean Intellectual Property Office, the disclosure of which is incorporated by reference herein in its entirety.

BACKGROUND

1. Field

Various embodiments of the disclosure generally to an electronic device for image synthesis and an operating method thereof.

2. Description of the Related Art

Electronic devices (e.g., a mobile terminal, a smart phone, or a wearable device) may provide various functions. For example, in addition to a basic voice call function, the electronic device may provide a short-range wireless communication function, a mobile communication (3rd generation (3G), 4th generation (4G), or 5th generation (5G)) function, a music play function, a video play function, a photographing function, or an image synthesis function.

The electronic device may provide a function for acquiring a user's intended new image through the image synthesis function. For example, the electronic device may provide a new image to the user, by arranging an object of a specific image to another image.

SUMMARY

An electronic device may select a target object to synthesize based on a user input, synthesize the synthesis target object at a particular position of a background image designated based on a user input, and thus acquire a user's intended synthetic image. As such, determining the synthesis target object and the synthesis position based on the user input is limited in satisfying a user's need for convenience.

Thus, an embodiment of the disclosure provides a method and an apparatus for synthesizing an image based on user preference information in an electronic device.

According to an embodiment, an electronic device may include a display, a processor operatively coupled to the display, and a memory operatively coupled to the processor, wherein the memory may store instructions, when executed, causing the processor to identify at least one target object in a first image, and at least one background object in a second image, determine a position for arranging the at least one target object on the second image, based on correlation of the at least one identified target object and the at least one identified background object, obtain a third image by arranging the at least one target object based on the determined position on the second image, and display the obtained third image on the display.

According to an embodiment, an operating method of an electronic device may include identifying at least one target object in a first image, and at least one background object in a second image, determining a position for arranging the at least one target object on the second image based on correlation of the at least one target object identified and the at least one background object identified, obtaining a third image by arranging the at least one target object based on the determined position on the second image, and displaying the obtained third image on a display.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
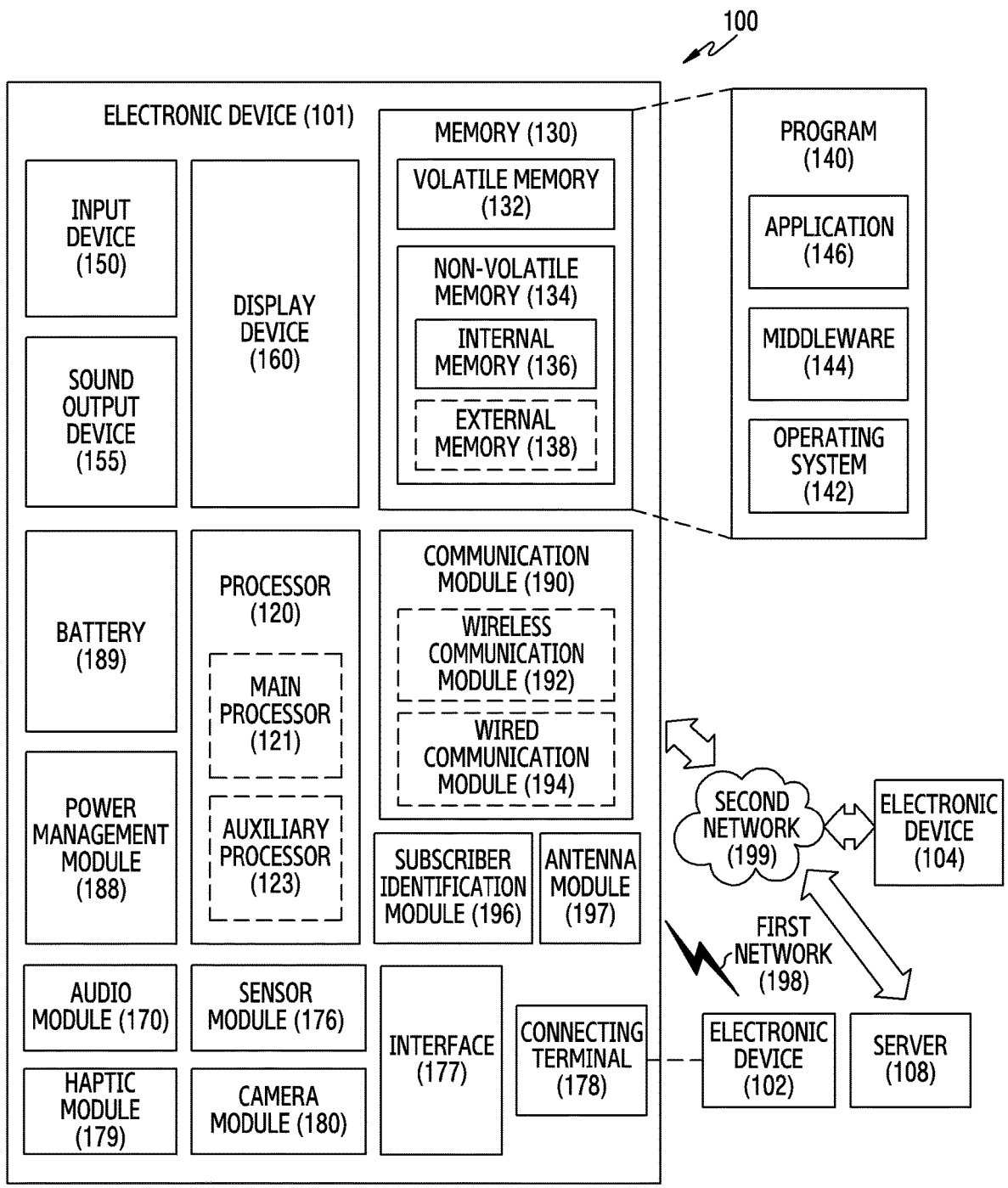
FIG. 1 is a block diagram of an electronic device in a network environment according to an embodiment.

Hereinafter, various embodiments of the disclosure are described with reference to the accompanying drawings. It should be understood that the embodiment and terms used therein are not to limit the technique disclosed in the disclosure to particular forms, but to include various modifications, equivalents, and/or alternatives of corresponding embodiments. In describing the drawings, similar reference numerals may be used for similar constituent elements. The expression of the singular form may include the expression of the plural form, unless otherwise dictating clearly in context.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an ISP or a CP) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, ISPs, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the AP) and supports a direct (e.g., wired) communication or a wireless communication. According to an embodiment, the communication module 190 may include a wireless communication module 192 (e.g., a cellular communication module, a short-range wireless communication module, or a global navigation satellite system (GLASS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
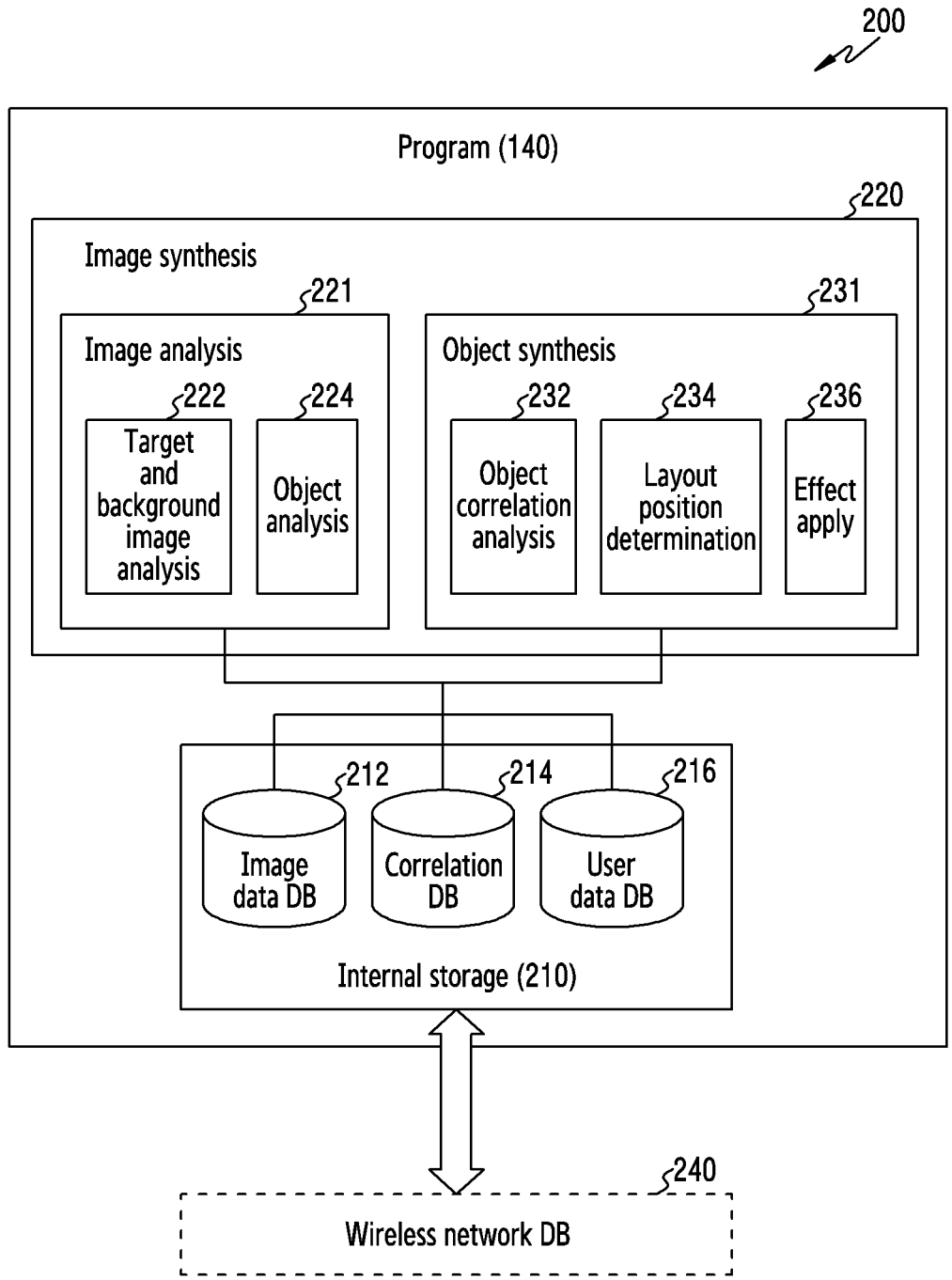
FIG. 2 is a block diagram illustrating a program in an electronic device according to an embodiment.

FIG. 2 is a block diagram 200 of a program 140 in an electronic device 101 according to various embodiments. The program 140 of FIG. 2 may be at least part of the program 140 of FIG. 1. At least part of the program 140 of the electronic device 101 may be, for example, preloaded to the electronic device 101 at a manufacturing phase, or downloaded or updated from an external electronic device (e.g., the electronic device 102 or 104, or the server 108) if the user uses it. Referring to FIG. 2, the program 140 may include an internal storage 210 and an image synthesis block 220.

The internal storage 210 may include, for example, an image data database (DB) 212, a correlation DB 214, and a user data DB 216. The image data DB 212 may store, for example, an image obtained from at least one of the camera module 180, the interface 177, or the communication module 190. The correlation DB 214 may include correlation information of at least two objects. The correlation information of at least two objects may include information relating to at least one of similarity, association, a preferred composition, a preferred size ratio, or a preferred distance of the at least two objects. The two objects may include a target object and a background object, a target object and a target object, or a background object and a background object. According to an embodiment, the information in the correlation DB 214 may be acquired by analyzing at least one image stored in the image data DB 212, or by analyzing at least one object obtainable from a wireless network DB 240. According to an embodiment, the correlation DB 214 may be updated based on the user data DB 216. The user data DB 216 may store information obtainable by using the electronic device 101. According to an embodiment, the user data DB 216 may include information obtainable in a user photographing event for a particular object. For example, the user data DB 216 may include at least one of a photographing composition, a photographing position, a photographing filter, a size of the object, a distance to the object, a photographing time, or a photographing place of the particular object. According to an embodiment, the user data DB 216 may include information obtainable in an image synthesis event for the particular object. For example, in the image synthesis, the user data DB 216 may include at least one of a layout position (or a layout area) of a target object determined by a user input, a target object size adjusted by a user input, a filter selected by a user input, and a graphic effect selected by a user input. According to an embodiment, the user data DB 216 may include information inputted from the user. For example, the user data DB 216 may include user's web search information, user's shopping information (e.g., type and name of a purchased item), or content information (e.g., type and name of content viewed). According to an embodiment, the information stored in each DB may be stored in or shared with, for example, the wireless network DB 240 (e.g., a cloud). Each DB may be updated by the wireless network DB 240. For example, the correlation DB 214 may include correlation information of at least two objects obtained from the wireless network DB 240. The correlation information of at least two objects obtained from the wireless network DB 240 may include information relating to at least one of the preferred composition, the preferred size ratio, or the preferred distance of at least another user for the at least two objects.

The image synthesis block 220 may include, for example, an image analysis block 221 and an object synthesis block 231. According to an embodiment, the image analysis block 221 may perform at least one of target and background image analysis 222, and object analysis 224. For example, by performing at least one of image classification, image localization, object detection, or object segmentation, the image analysis block 221 may analyze a target image and a background image, and determine at least one target image and/or at least one background image. The image classification may acquire information relating to a type (e.g., a person, a thing, an animal, an adult, a child, a male, a female, a dog, a cat, a tree, a vehicle, etc.) of the object in the image. The image localization may acquire position information of the object in the image. The object detection may detect an object by performing both of the image classification and the image localization. The object segmentation may display and/or segment an object area based on a shape of the object detected through the object detection. The image analysis block 221 may analyze an image, and identify and/or determine at least one of the target object or the background object based on an analysis result. The image analysis block 221 may, for example, identify at least one object by analyzing a first image, and determine at least one target object to synthesize to at least one second image, based on information of the at least one object identified. The information of the at least one object identified may include at least one of a type, a position, brightness, a color, or a shape (or form) information of the object. The image analysis block 221 may, for example, identify at least one object by analyzing at least one second image, and determine at least one background object, based on information of the at least one object identified. The at least one second image may be video content including a plurality of second images.

According to an embodiment, the object synthesis block 231 may perform at least one of object correlation analysis 232, layout position determination 234, and effect apply 236. For example, the object synthesis block 231 may analyze the correlation between the target object and the background object based on at least one of word embedding or attention algorithm, and determine a layout position (or a layout area). The word embedding may represent meaning of a word with a vector. Using the word embedding, the object synthesis block 231 may determine the correlation (or similarity) between the objects. The attention algorithm may determine a portion including main features in the image. Using the attention algorithm, the object synthesis block 231 may determine a main background object including main features of the image among background objects. The object synthesis block 231 may determine a layout position for synthesizing the target object, based on at least one of the correlation of the objects and the main background object. The object synthesis block 231 may synthesize the target object to the determined layout position, and apply an effect. The effect apply may include at least one of apply filter, change color, adjust target object size, and adjust brightness.

According to an embodiment, the processor 120 may determine correlation of objects based on the image data DB 212 or the user data DB 216, and store the determined correlation information in the correlation DB 214. The processor 120 may analyze at least one image stored in the image data DB 212, and thus determine correlation between objects in the at least one image. For example, the processor 120 may analyze at least one image using at least one of a similarity measurer, a relation extractor, or a body skeleton analyzer, and determine correlation between objects based on the analysis result. The similarity measurer may indicate a module for measuring similarity or association between the objects in the image. The similarity or the association may be represented in steps, or in numbers. For example, the similarity or the association may be represented as the step such as high similarity, middle similarity, or low similarity, or as a value ranging from 0 to N. For example, by analyzing image stored in the image data DB 212 using the similarity measurer, the processor 120 may obtain high similarity between a first object "me" and a second object "cat", and store the obtained similarity in the correlation DB 214. The relation extractor may indicate a module for extracting relation between objects in an image as a sentence. The body skeleton analyzer may indicate a module for analyzing an action of an object in an image. For example, the processor 120 may extract a sentence expressing relationship between objects such as "A child is wearing trunks for swimming", by analyzing at least one image stored in the image data DB 212 using the relation extractor, and extract information indicating that the action of the corresponding object is "jump" using the body skeleton analyzer. Based on the sentence expressing the relationship between the objects and the information indicating the action of the object, the processor 120 may determine the correlation between the objects, and update the correlation DB 214 based on the determined correlation.

According to an embodiment, the processor 120 may detect an image synthesis event. The image synthesis event may occur by application execution for the image synthesis, or menu selection for the image synthesis. In response to detecting the image synthesis event, the processor 120 may switch to an image synthesis mode. By switching to the image synthesis mode, the processor 120 may provide a user interface requesting to determine (or select) a first image including a target object to synthesize and a second image including a background object. The first image may be an image including, for example, at least one of a person, a thing, or an animal which is the target object to synthesize, and the second image may be an image including, for example, a background object (e.g., a building, a nee, a flower, a river, etc.) such as a masterpiece or scenery. These are simply examples for the sake of explanation, and the disclosure is not limited thereto. For example, the second image may include objects such as a person, a thing, or an animal, and the first image may be a scenery image. The processor 120 may determine the first image and the second image based on a user input. At least one of the first image and the second image may be prestored in the memory 130 of the electronic device 101, obtained from the camera module 180, or obtained from an external device (e.g., the server 108, the electronic device 102 or 104).

According to an embodiment, the processor 120 may identify at least one target object, by analyzing the first image. By analyzing the first image, the processor 120 may detect at least one object in the first image, and segment the detected at least one object. The processor 120 may obtain information of the segmented at least one object, and determine at least one target object based on the at least one object information. The at least one object information may include object size, object position coordinates in the first image, object name (e.g., identification information), object color, object feature, object shape, or object brightness information. The at least one object information may be feature information of the first image.

According to an embodiment, the processor 120 may determine at least one object including main features of the first image among objects in the first image, as the target object. For example, based on information of each object in the first image, the processor 120 may determine at least one object including the main features of the first image, and determine the determined at least one object as the target object to synthesize. The processor 120 may determine at least one of the objects in the first image, as the target object based on user preference information. For example, the processor 120 may determine a user's preferred object among the objects in the first image based on the user preference information, and determine the determined user preferred object as the target object to synthesize. The user preference information may be determined based on the data stored in the user data DB 216. For example, if the user preference information is "preferred target: cat" and the information of the objects in the first image is "first object: cat" and "second object: person", the processor 120 may determine the first object corresponding to the preferred target as the target object. Based on the at least one object information, the processor 120 may visually display the at least one object detection in the first image, and thus request the user to select the detected at least one object. For example, the processor 120 may display a bounding box at a position (or an area) of the detected at least one object on the first image, and thus request to select the target object to synthesize from at least one object displayed in the bounding box. The at least one object information may be overlaid on or near the area of the corresponding object together with the bounding box on the first image. For example, by displaying a list including the at least one object information, the processor 120 may request the user to select at least one object in the displayed list. The processor 120 may determine at least one object selected by a user input, as the target object.

According to an embodiment, if the first image includes a plurality of objects, the processor 120 may determine at least one target object based on correlation of the objects. For example, if the correlation of the objects satisfies a designated condition, the processor 120 may determine the objects as the target objects. For example, if a correlation coefficient of two of the objects is greater than a designated value, the processor 120 may determine the two objects as the target objects. For example, the processor 120 may identify a first main object among the objects, and determine whether there is at least one other object of which the correlation efficient of the identified first main object is greater than a designated value. The first main object may correspond to the user preference information, selected by a user input, or include the main features of the first image. If detecting at least one other object of which the correlation efficient of the identified first main object is greater than the designated value, the processor 120 may determine the first main object and the at least one other object as the target objects. If not detecting at least one other object of which the correlation efficient of the identified first main object is greater than the designated value, the processor 120 may determine only the first main object as the target object.

According to an embodiment, by analyzing the second image, the processor 120 may detect at least one object in the second image, and segment the detected at least one object. The processor 120 may obtain information of the segmented at least one object, and determine at least one background object based on the at least one object information. The at least one object information may be feature information of the second image. The feature information of the second image may include information of the object in the second image, for example, at least one of object size, object position coordinates, object name (e.g., identification information), object color, object feature, object shape, or object brightness information. The background object may be used to determine a layout position of the target object to synthesize in the second image. The processor 120 may determine at least one object including main features of the second image as the background object among the objects in the second image. For example, based on information of each object in the second image, the processor 120 may determine at least one object including the main features of the second image, and determine the determined at least one object as the background object. If the second image includes the objects over a designated number, the processor 120 may select objects in a designated number, and determine the selected objects as the background objects. For example, the processor 120 may determine only N-ary objects including the main features of the second image as the background objects, among the objects in the second image.

According to an embodiment, the processor 120 may determine correlation of the target object determined (or selected) in the first image and the at least one background object determined (or selected) in the second image. For example, if a first target object corresponding to "me" and a second target object corresponding to "cat" are determined in the first image, and a first background object corresponding to "building", a second background object corresponding to "vehicle", and a third background object corresponding to "traffic lights" are determined in the second image, the processor 120 may determine correlation of "me" and "building", correlation of "me" and "vehicle", correlation of "me" and "traffic lights", correlation of "cat" and "building", correlation of "cat" and "vehicle", and correlation of "cat" and "traffic lights". The correlation of the target object and the background object may include a correlation coefficient indicating at least one of the similarity or the association of the target object and the background object. The correlation of the target object and the background object may further include at least one of preferred composition information for the target object and the background object, preferred ratio information for the target object and the background object, preferred color information for the target object and the background object, preferred place information for the target object and the background object, preferred filter information for the target object and the background object, preferred distance information for the target object and the background object, preferred light direction information for the target object and the background object, or preferred time information for the target object and the background object.

According to an embodiment, the processor 120 may determine the correlation of the target object and the background object based on the information in at least one of the image data DB 212, the correlation DB 214, and the user data DB 216. For example, the processor 120 may retrieve correlation information of the target object determined in the first image and at least one background object determined in the second image from the correlation DB 214. For example, the processor 120 may retrieve images including the target object and the background object from the images stored in the image data DB 212, and determine the correlation of the target object and the background object based on the number of the retrieved images. For example, if seven images include a first target object and a first background object and 20 images include the first target object and a second background object, relationship of the first target object and the second background object may be determined to be higher than relationship of the first target object and the first background object. The processor 120 may analyze the retrieved images including the target object and the background object, and thus further determine at least one of a preferred composition, a preferred ratio, a preferred color, a preferred place, a preferred filter, a preferred light direction, or a preferred time for the target object and the background object. For example, using images including "cat" and "tree", the processor 120 may determine that the preferred composition for "cat" and "tree" arranges "cat" beside "tree", the preferred composition for "cat" and "me" using images including "cat" and "me" arranges "cat" beneath a face of "me" or arranges "cat" in a body area of "me", and the preferred ratio of "me":"cat" is 1:0.5. For example, based on the information stored in the user data DB 216, the processor 120 may determine the correlation of the target object and the background object.

According to an embodiment, the processor 120 may determine the correlation of the target object and the background object, using image-to-text conversion. For example, using the image-to-text conversion, the processor 120 may display data indicating features of the second image in the form of "subject, verb, object". For example, the processor 120 may analyze the second image in which a person holds a hand phone, and thus obtain data such as "person, hold, hand phone". If the target object is "hand phone" or an object highly related to "hand phone", the processor 120 may assign a weight wherein the background object "person" in the second image has high association with the target object, or assign a weight wherein the background object "hand" associated with the background object verb "hold" in the second image has high association than the target object.

According to an embodiment, the processor 120 may determine a layout position of the target object based on the correlation of the target object and the background object. The layout position of the target object may include position information for synthesizing the target object to the second image. For example, the layout position of the target object may include coordinate information for arranging the target object in the second image. In response to a plurality of second images, the layout position of the target object may further include at least one of time information (play time information) indicating at least one second image for synthesizing the target object, or sequence information. For example, if the target object of the first image is synthesized to video content including a plurality of second images, the layout position of the target object may further include time information indicating a play time of at least one second image for synthesizing the target object, or the layout position of the target object in the images may further include sequence information indicating a sequence of at least one second image for synthesizing the target object.

According to an embodiment, the processor 120 may determine a correlation coefficient based on the correlation determined for the target object and the background object, and determine the layout position of the target object based on the correlation coefficient. For example, the processor 120 may determine the correlation coefficient based on at least one of the similarity, the association, or the weight for the target object and the background object. The processor 120 may determine at least one background object of the highest correlation coefficient among the background objects in the second image, and determine at least one candidate layout area based on the selected background object. The candidate layout area may include at least one of an area including at least part of the selected background object, or at least one area adjacent to the selected background object. For example, the candidate layout area may include at least part of a left area, a right area, an upper area, or a lower area adjacent to the selected background object. Based on the preferred composition information included in the correlation of the target object and the selected background object, the processor 120 may determine one of at least one candidate layout area as a final layout area. For example, if correlation coefficients of background objects "me", "tree", "grass" in relation to the target object "cat" is 0.95, 0.54, and 0.32 respectively, the processor 120 may select "me" of the greatest correlation coefficient, and determine a first area indicating an area corresponding to the body in the area of the background object "me" in the second image, a second area indicating a left lower area adjacent to the background object "me", and a third area indicating a right lower area adjacent to the background object e as the candidate layout areas. If the preferred composition of "cat" and "me" arranges "cat" in the body portion of "me", the processor 120 may determine the first area of the candidate layout areas as the final layout area. The processor 120 may determine the layout position based on the final layout area. The layout position may indicate at least one coordinates corresponding to the final layout area. The layout position may include, for example, at least one coordinates corresponding to a center area of the final layout area, at least one coordinates corresponding to a boundary of the final layout area, or at least one coordinates corresponding to the whole final layout area.

According to an embodiment, the processor 120 may select a plurality of background objects of a high correlation coefficient from the background objects in the second image, and determine at least one candidate layout area based on the selected background objects. For example, the processor 120 may select a designated number of background objects having the high correlation coefficient for the target object from the background objects in the second image. According to an embodiment, the processor 120 may identify a plurality of candidate layout areas based on the selected background objects, and select at least one of the identified candidate layout areas, by considering at least one of the preferred composition information, the main features of the second image, or the light direction in the correlation of the target object and the selected background object. For example, the processor 120 may select the candidate layout area corresponding to the user's preferred composition information for the target object and the corresponding background object among the identified candidate layout areas. For example, if the correlation coefficients of the background objects "me", "tree", "grass" in relation to the target object "cat" are 0.95, 0.54, and 0.32 respectively, the processor 120 may select "me" and "tree" of the greatest correlation coefficient, and identify, as the candidate layout areas, the first area indicating the area corresponding to the body in the area of the background object "me" in the second image, the second area indicating the left lower area adjacent to the background object "me", the third area indicating the right lower area adjacent to the background object "me", a fourth area indicating an area corresponding to roots in the area of the background object "tree", a fifth area indicating a left right lower area adjacent to the background object "tree", and a sixth area indicating a right lower area adjacent to the background object "tree". If the preferred composition of "cat" and "me" arranges "cat" in the body portion of "me" and the preferred composition of "cat" and "tree" arranges "cat" in the left lower area of "tree", the processor 120 may select the first area and the fifth area from the identified candidate layout areas. For example, the processor 120 may select the candidate layout area not overlapping the main features of the second image from the identified candidate layout areas. For example, if the second image is "a photo taken with friends at a park" and the first through sixth areas are identified as above, the processor 120 may identify areas of other background objects "friend 1" and "friend 2" corresponding to the main features of the second image, in the third area and the fifth area of the first through sixth areas. The processor 120 may select the first area, the second area, the fourth area, and the sixth area excluding the third area and the fifth area corresponding to the main features, as the candidate layout areas. For example, based on the preferred composition information in the correlation of the target object and the selected background object and the main features of the second image, the processor 120 may determine at least one of the identified candidate layout areas. For example, the processor 120 may determine at least one candidate layout area corresponding to the preferred composition information and not overlapping the main features of the second image, among the identified candidate layout areas.

According to an embodiment, the processor 120 may display graphic data and/or text data indicating the determined candidate layout area on the second image, and determine a final layout area, based on a user input which selects one of the displayed candidate layout areas. The graphic data and/or the text data indicating the candidate layout area may include at least one of a bounding box indicating at least one of a shape or a position of the candidate layout area, a name of an object corresponding to the candidate layout area, a correlation coefficient of the object corresponding to the candidate layout area, or a sequence of the correlation coefficient of the object corresponding to the candidate layout area. At least part of the graphic data and/or the text data indicating the candidate layout area may be overlaid on the second image. At least part of the graphic data and/or the text data indicating the candidate layout area may be provided as a list. For example, by additionally displaying the names and the correlation coefficients of the object "me" corresponding to the first area and the object "tree" adjacent to the fifth area together with bounding boxes indicating the first area and the fifth area in the second image, the processor 120 may request the user to select an area for arranging the target object "cat" from the fifth area and the fifth area. The processor 120 may determine the area selected by the user as the final layout area for synthesizing the target object "cat", and determine a position including at least one coordinates corresponding to a center area of the final layout area as the layout position.

According to an embodiment, the processor 120 may generate a third image in which the target object is synthesized to the second image, by arranging the target object to the determined final layout position. The processor 120 may retrieve correlation information of the target object and the background object corresponding to the determined layout position from the correlation DB 214, and adjust at least one of a layout size or a specific position of the target object based on the retrieved correlation information. For example, the processor 120 may adjust the layout size or the specific position of the target object, based on at least one of the preferred size ratio or the preferred layout distance in the correlation information of the background object corresponding to the determined layout position and the target object. The specific position may include an accurate position for arranging the target object based on the determined layout position. For example, if the layout position is A coordinates, the processor 120 may determine the specific position to arrange an upper portion of the target object at the A coordinates, to arrange a middle portion of the target object at the A coordinates, or to arrange a lower portion of the target object at the A coordinates. For example, if the layout position is the A coordinates, the processor 120 may determine the specific position, wherein bottom coordinates of the target object corresponding to the layout position correspond to the bottom portion of the target object. By arranging the target object at the determined layout position, the processor 120 may synthesize the target object and the second image, and apply at least one effect. The at least one effect may include at least one of apply filter, change color, or adjust brightness. The effect may be determined based on at least one of the image data. DB 212, the correlation DB 214, and the user data DB 216. For example, the processor 120 may detect images including the target object from the images stored in the image data DB 212, determine a user's favorite effect by analyzing effects applied to the detected images, and apply the determined effect to the target object or at least part of the synthetic image of the target object. For example, based on the data stored in the user data DB 216, the processor 120 may determine an effect mainly applied by the user to capture the target object, and apply the determined effect to the target object or at least part of the synthetic image of the target object. The processor 120 may display a list of the determined at least one effect on the display device 160, and apply an effect selected based on a user input in the displayed list, to the synthetic image.

While it has been described that the target object to synthesize is acquired from the first image, the target object to synthesize may be acquired from other data than the image. For example, the processor 120 may determine a text or an icon as the target object to be synthesized to the second image, based on a user input.

According to an embodiment, an electronic device may include a display, a processor operatively coupled to the display and, a memory operatively coupled to the processor, wherein the memory may store instructions, which when executed, cause the processor to identify at least one target object in a first image, and at least one background object in a second image, determine a position for arranging the at least one target object on the second image, based on correlation of the at least one identified target object and the at least one identified background object, obtain a third image by arranging the at least one target object based on the determined position on the second image, and display the obtained third image on the display.

The memory may be configured to store at least one of a plurality of images or user data, and the instructions may further cause the processor to obtain correlation information relating to the at least one target object and the at least one background object based on at least one of the stored images or the user data, and the correlation information may include a correlation coefficient indicating at least one of similarity or association of the at least one target object and the at least one background object.

The correlation information may include at least one of preferred composition, a preferred layout distance, a preferred ratio, a preferred color, a preferred filter, or preferred brightness with respect to each of the at least one target object and the at least one background object.

The instructions may further cause the processor to, based on the correlation information, determine at least one of the composition, the layout distance, or the ratio with respect to the at least one target object and the at least one background object, and arrange the at least one target object at the determined position on the second image further based on at least one of the determined composition, layout distance, or ratio.

The instructions may further cause the processor 120 to obtain feature information of the second image, and determine the position for arranging the at least one target object on the second image based on the obtained feature information.

The instructions may further cause the processor to determine at least one main background object indicating features of the second image among the at least one background object, determine at least one candidate area not overlapping the determined main background object, and determine the position for arranging the at least one target object on the second image based on the determined at least one candidate area.

The instructions may further cause the processor to identify at least one object in the first image by analyzing the first image, and determine at least one object indicating features of the first image among the identified at least one object, as the at least one target object.

The instructions may further cause the processor to control the display to display graphic data notifying at least one object indicating the features of the first image among the identified at least one object, and determine at least one object selected by a user input to the at least one target object among at least one object indicating the features of the first image.

The instructions may further cause the processor to, if a plurality of objects indicates the features of the first image, determine a first main object based on the features of the first image among the plurality of the objects, determine a correlation coefficient of the first main object and other object of the plurality of the objects, if the determined correlation coefficient satisfies a designated value, determine the first main object and the other object as target objects to be synthesized with the second image, and if the determined correlation coefficient does not satisfy the designated value, determine only the first main object as the target object to be synthesized with the second image.

The instructions may further cause the processor to identify at least one object in the second image by analyzing the second image, and determine at least one object indicating features of the second image as the at least one background object among the identified at least one object.

The instructions may further cause the processor to, based on correlation for the at least one target object and the at least one background object, determine a plurality of candidate layout areas for arranging the at least one target object, control the display to display graphic data indicating the determined candidate layout areas on the second image, determine one of the candidate layout areas, based on a user input, and determine a position for arranging the at least one target object on the second image based on the determined candidate layout area.

The instructions may further cause the processor to determine one of the candidate layout areas, based on preferred composition for the target object and the at least one background object, and determine the position for arranging the at least one target object on the second image based on the determined candidate layout area.

The instructions may further cause the processor to identify an ambient object adjacent to the determined position on the second image, adjust a size of the at least one target object, based on a size of the identified ambient object, and obtain the third image by arranging the at least one target object of the adjusted size at the determined position on the second image.

The instructions may further cause the processor to apply a graphic effect to at least part of the third image, based on user preference information obtained from at least one of the memory or an external device, and the graphic effect may include at least one of adjust color, apply filter, or control brightness.

Figure 3:
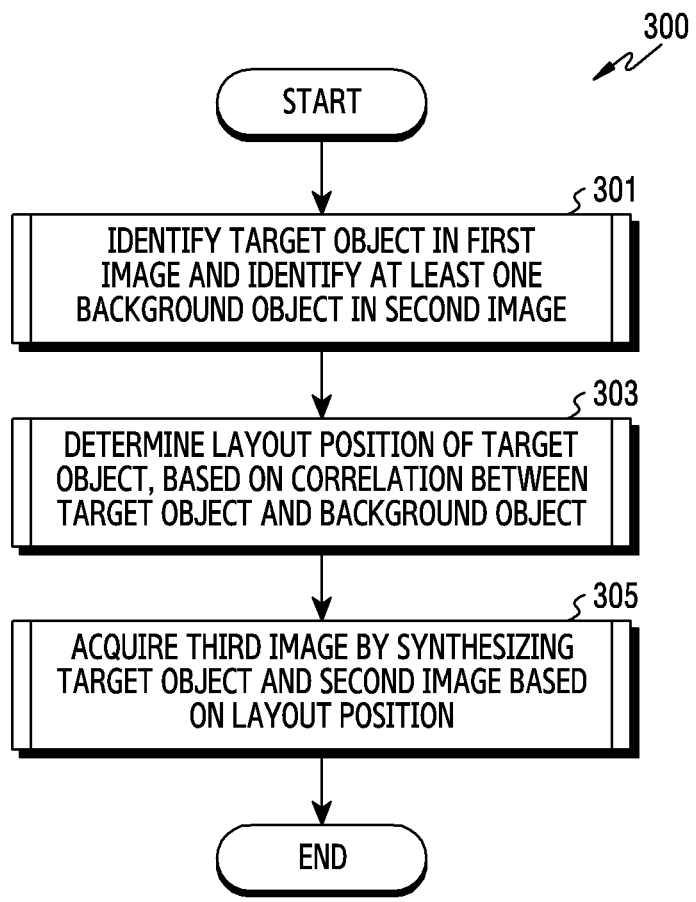
FIG. 3 is a flowchart of a method for synthesizing an image in an electronic device according to an embodiment.

FIG. 3 is a flowchart 300 of a method for synthesizing an image in an electronic device according to an embodiment. The operations may be performed sequentially, but not necessarily. For example, the order of the operations may be changed, and at least two operations may be performed in parallel. Herein, the electronic device may be the electronic device 101 of FIG. 1.

Referring to FIG. 3, in operation 301, the electronic device (or the processor 120 of FIG. 1) may identify a target object in a first image, and identify at least one background object in a second image. The first image and the second image may be determined based on a user input. For example, the first image and the second image each may be selected from images stored in a memory 130 based on a user input, obtained from a camera module 180, or obtained from an external device (e.g., the server 108, the electronic device 102 or 104).

According to an embodiment, by analyzing the first image, the processor 120 may identify at least one target object to synthesize to the second image. The processor 120 may obtain at least one object information in the first image by analyzing the first image, and determine at least one object indicating main features of the first image as the target object based on the obtained information. The at least one object information may include object size, object position coordinates in the first image object name, object color, object feature, object shape, or object brightness information. If a plurality of objects indicates the main features of the first image, the processor 120 may determine at least one target object, based on at least one of the user preference information or the correlation of the objects. For example, the processor 120 may determine a user preferred object among the objects indicating the main features of the first image based on the user preference information, and determine at least one target object, based on correlation coefficients between the user preferred object and other objects. The target object may include the user preferred object.

According to an embodiment, the processor 120 may detect at least one object in the second image by analyzing the second image, and obtain information of the detected at least one object. The at least one object information may include object size, object position coordinates in the second image, object name, object color, object feature, object shape, or object brightness information. Based on the at least one object information, the processor 120 may determine at least one background object to be used to determine a layout position of the target object to be synthesized to the second image. If the second image includes a plurality of objects, the processor 120 may select and determine a designated number of objects indicating the main features of the second image among the objects, as the background objects.

According to various embodiments, in operation 303, the processor 120 may determine the layout position of the target object based on the correlation between the target object and the background object. Based on the correlation DB 214 stored in the memory 130, the processor 120 may determine the correlation of the target object and each background object. For example, if the target object identified in the first image is "me" and the background objects identified in the second image are "building" and "vehicle", the processor 120 may obtain correlation of the target object "me" and the first background object "building" and correlation of the target object "me" and the second background object "vehicle" from the correlation DB 214. The correlation of the target object and the background object may include the correlation coefficient indicating at least one of the similarity or the association of the target object and the background object. The correlation of the target object and the background object may further include at least one of preferred composition, preferred ratio, preferred color, preferred place, preferred filter, preferred distance, preferred light direction, or preferred time information for the target object and the background object. The correlation DB 214 may be generated and/or updated, based on at least one of the analysis result of the images prestored in the image data DB 212 or the user preference information obtained based on the user data DB 216. The processor 120 may determine the layout position of the target object based on the correlation of the target object and each background object. The processor 120 may select the background object based on the correlation coefficient of the target object, and determine at least part of the selected background object or an adjacent area of the selected background object as the layout position of the target object. For example, the processor 120 may determine at least part of the background object having the highest correlation coefficient with the target object, or an adjacent area to the background object having the highest correlation coefficient with the target object, as the layout position of the target object.

According to various embodiments, in operation 305, the processor 120 may acquire a third image by synthesizing the target object and the second image based on the layout position. For example, the processor 120 may generate the third image in which the target object is synthesized to the second image by arranging the target object at the determined layout position. The processor 120 may adjust at least one of a layout size or a specific position of the target object, based on the correlation information of the target object and the background object corresponding to the determined layout position. For example, the processor 120 may adjust the layout size or the specific position of the target object, based on at least one of the preferred size ratio or the preferred layout distance in the correlation information of the target object and the background object corresponding to the determined layout position. If synthesizing the target image and the second image, the processor 120 may apply at least one effect. The at least one effect may include at least one of apply filter, change color, or adjust brightness. The at least one effect may be determined based on at least one of the image data. DB 212, the correlation DB 214, and the user data DB 216.

Figure 4A:
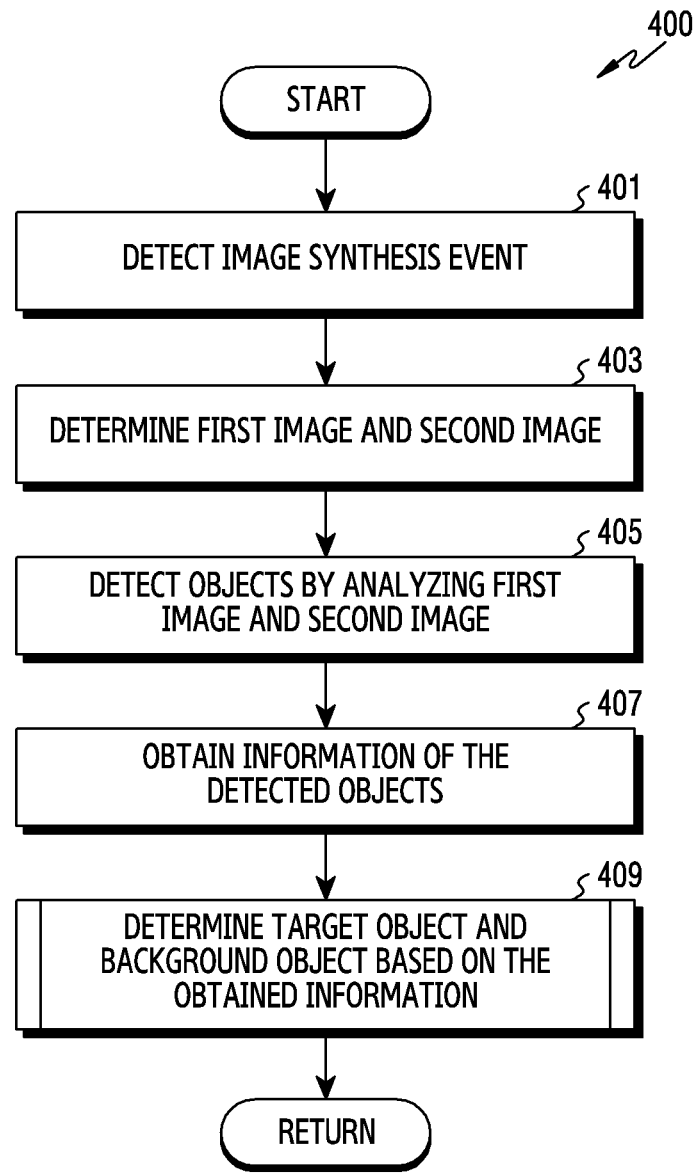
FIG. 4A is a flowchart of a method fir determining a synthesis target object and a background object in an electronic device according to an embodiment.
Figure 4B:
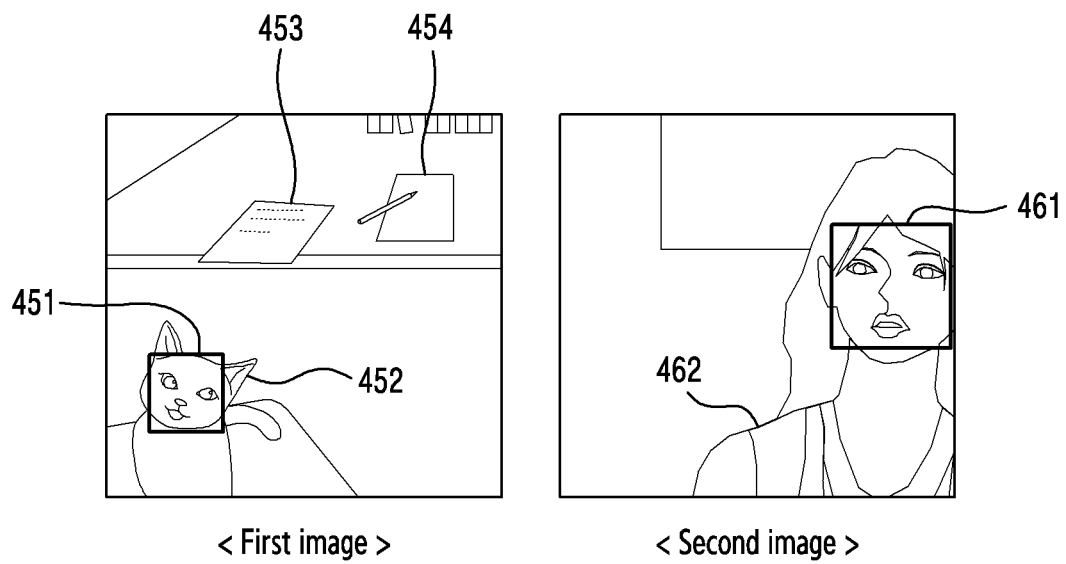
FIG. 4B is a diagram of the target object and the background object determined in two images to synthesize in the electronic device according to an embodiment.

FIG. 4A is a flowchart 400 of a method for determining a synthesis target object and a background object in an electronic device according to an embodiment. The operations of FIG. 4A may be at least some of the detailed operations of operation 301 of FIG. 3. The operations may be performed sequentially, but not necessarily. For example, the order of the operations may be changed, and at least two operations may be performed in parallel. Herein, the electronic device may be the electronic device 101 of FIG. 1. At least some operation of FIG. 4A shall be described with reference to FIG. 4B. FIG. 4B is a diagram illustrating the synthesis target object and the background object determined in two images to synthesize in the electronic device according to an embodiment.

Referring to FIG. 4A, the electronic device (or the processor 120 of FIG. 1) according to an embodiment may detect an image synthesis event in operation 401. The image synthesis event may be generated by at least one of application execution for the image synthesis function, menu selection for the image synthesis, or designated gesture detection for the image synthesis. In response to detecting the image synthesis event, the processor 120 may switch to the image synthesis mode.

According to various embodiments, in operation 403, the processor 120 may determine a first image and a second image. If switching to the image synthesis mode, the processor 120 may provide a user interface requesting to determine (or select) the first image including a target object to synthesize and the second image including a background object, through a display 160. The first image may be an image including, for example, at least one of a person, a thing, or an animal which is the target object to synthesize, and the second image may be an image including, for example, a background object (e.g., a building, a tree, a flower, a river, etc.) such as scenery or a masterpiece. These are simply examples for the sake of explanation, and the disclosure is not limited thereto. For example, if detecting the image synthesis event, the processor 120 may provide the user interface for selecting at least one of the first image and the second image among the images prestored in the memory 130. For example, if detecting the image synthesis event, the processor 120 may provide a user interface for obtaining at least one of the first image and the second image by capturing using the camera module 180. For example, if detecting the image synthesis event, the processor 120 may provide a user interface for receiving at least one of the first image and the second image from an external device, through connection to the external device (e.g., the server 108, the electronic device 102 or 104). The processor 120 may determine the first image and the second image based on a user input.

According to various embodiments, in operation 405, the processor 120 may detect objects by analyzing the first image and the second image. The processor 120 may analyze the first image and the second image, using at least one of image classification or image localization. The image classification may acquire information relating to a type (e.g., a person, a thing, an animal, an adult, a child, a male, a female, a dog, a cat, a tree, a vehicle, etc.) of the object in the image. The image localization may acquire position information of the object in the image. The processor 120 may perform object segmentation, based on analysis results of the first image and the second image. The object segmentation may display and/or segment an object area based on a shape of the object detected through the object detection.

According to various embodiments, in operation 407, the processor 120 may obtain information of the detected objects. The information of the detected objects may include at least one of type, size, position (or area), brightness, color, or form (or shape) information of the detected objects. The processor 120 may obtain the information of the detected objects, based on the analysis results of the first image and the second image of operation 405. The processor 120 may recognize a corresponding object based on features of the detected objects, and further obtain name information of the recognized object.

According to various embodiments, in operation 409, the processor 120 may determine a target object and a background object based on the obtained information. The processor 120 may determine at least one object including main features of the first image among the objects in the first image, as the target object. For example, based on information of the objects in the first image, the processor 120 may determine at least one object including the main features of the first image, and determine the determined at least one object as the target object to synthesize. The processor 120 may determine at least one object among the objects in the first image, as the target object based on the user preference information. For example, the processor 120 may determine a user's preferred object among the objects in the first image based on the user preference information, and determine the determined user preferred object as the target object to synthesize. The user preference information may be determined based on the data stored in the user data DB 216. For example, as shown in FIG. 4B, if objects corresponding to "cat" 452, "document" 453, and "note" 454 are detected in the first image and the preferred object in the user preference information is "cat", the processor 120 may determine the object corresponding to the "cat" 452 corresponding to the preferred object as the target object. The processor 120 may indicate that "cat" is determined as the target object, by displaying at least some area 451 indicating features (e.g., eyes, nose, mouth, and/or face) of "cat" which is the determined target object. The processor 120 may determine at least one object including the main features of the second image among the objects in the second image, as the background image. For example, based on information of the objects in the second image, the processor 120 may determine at least one object including the main features of the second image, and determine the determined at least one object as the background object. If the objects in the second image exceed a designated number N, the processor 120 may select the N-ary objects, and determine the selected objects as the background objects. If the objects in the second image are less than or equal to the designated number N, the processor 120 may determine the objects in the second image as the background objects. For example, as shown in FIG. 4B, if detecting one object corresponding to "me" 462 in the second image, the processor 120 may determine the detected object corresponding to "me" 462 as the target object. The processor 120 may indicate that the object "me" is determined as the background object, by displaying at least some area 461 indicating features (e.g., eyes, nose, mouth, and/or face) of "me" which is the determined target object.

Figure 5A:
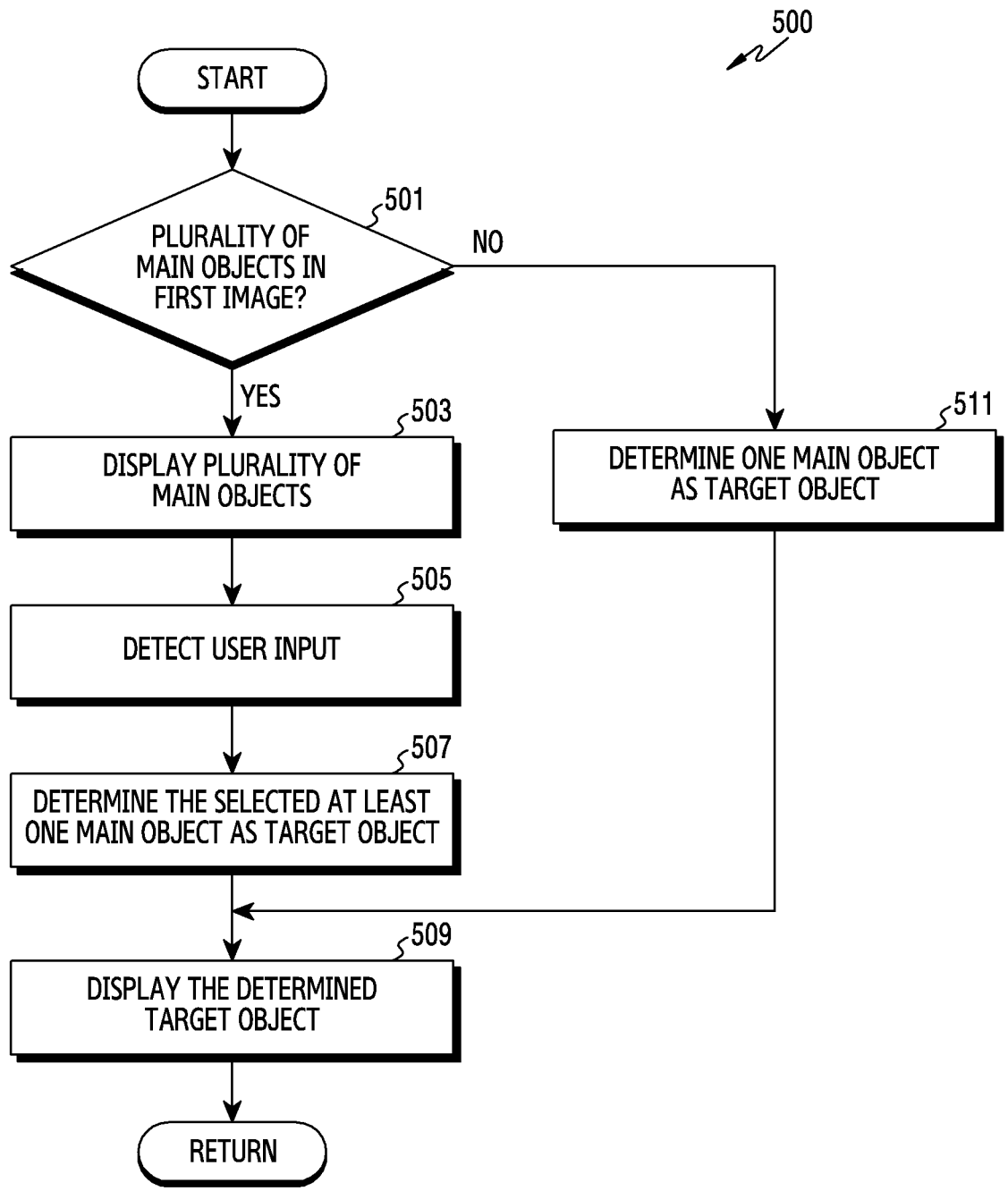
FIG. 5A is a flowchart of a method for determining a synthesis target object based on a user input in an electronic device according to an embodiment.
Figure 5B:
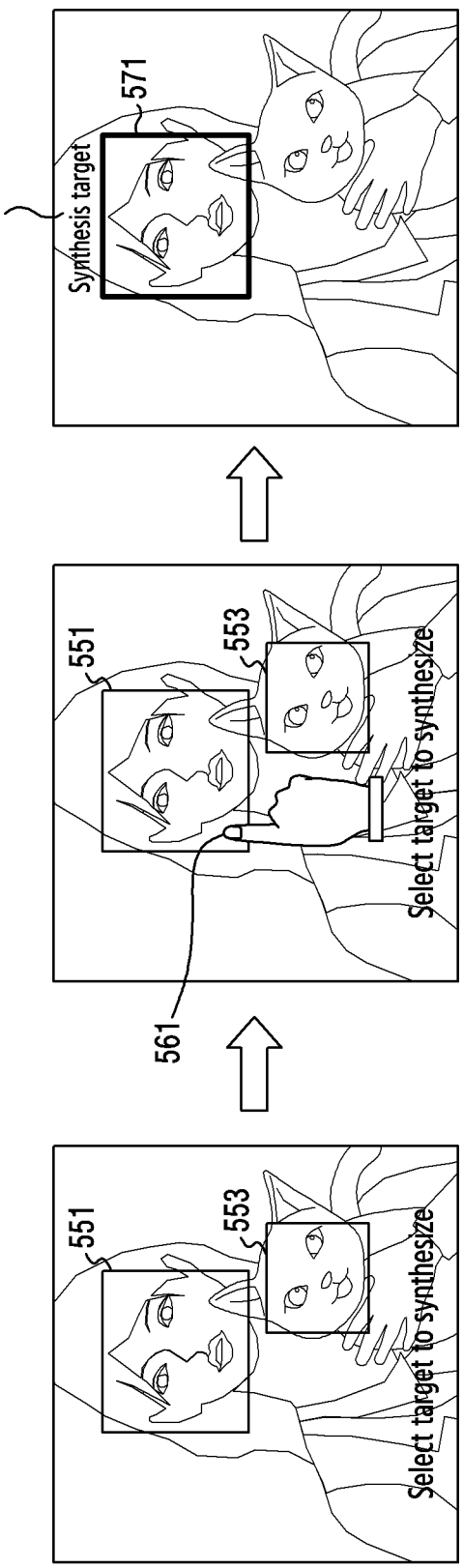
FIG. 5B is a diagram for determining the synthesis target object based on the user input in the electronic device according to an embodiment.

FIG. 5A is a flowchart 500 of a method for determining a synthesis target object based on a user input in an electronic device according to an embodiment. The operations of FIG. 5A may be at least some of the detailed operations of operation 301 of FIG. 3 or operation 409 of FIG. 4A. The operations may be performed sequentially, but not necessarily. For example, the order of the operations may be changed, and at least two operations may be performed in parallel. Herein, the electronic device may be the electronic device 101 of FIG. 1. At least some operation of FIG. 5A shall be described with reference to FIG. 5B. FIG. 5B is a diagram for determining the synthesis target object based on the user input in the electronic device according to an embodiment.

Referring to FIG. 5A, in operation 501, the electronic device (or the processor 120 of FIG. 1) according to an embodiment may determine whether a first image includes a plurality of main objects. The processor 120 may determine whether a plurality of main objects is detected in the first image. The main object may be an object indicating features of the first image. For example, if the first image is analyzed as a photo in which a user corresponding to "me" is holding "cat", the processor 120 may determine the presence of the object corresponding to "me" and the object corresponding to "cat" in the first image, as shown in FIG. 5B.

According to an embodiment, in response to one main object in the first image, the processor 120 may determine the one main object as the target object, in operation 511. For example, if the first image includes only one main object, the processor 120 may determine the one main object as the target object to synthesize.

According to an embodiment, if the first image includes a plurality of main objects, the electronic device (including the processor 120 and/or the display device 160) may display the plurality of the main objects in operation 503. For example, the processor 120 may display visual data indicating the plurality of the main objects detected in the first image on the display device 160, and thus request the user to select at least one of the detected objects. For example, as shown in FIG. 5B, the processor 120 may display bounding boxes 551 and 553 indicating features (e.g., eyes, nose, mouth, and/or face) of the detected objects "me" and "cat", and request the user to select at least one of the displayed objects using the bounding box.

According to an embodiment, in operation 505, the processor 120 may detect a user input which selects at least one of the main objects. For example, as shown in FIG. 5B, the processor 120 may detect a user input 561 which selects the object corresponding to "me" among the objects displayed in the bounding boxes 551 and 553.

According to an embodiment, in operation 507, the processor 120 may determine at least one main object selected based on the user input, as the target object. The processor 120 may determine at least one main object selected by the user input, as the target object to synthesize with the second image.

According to various embodiments, in operation 509, the processor 120 and/or the display device 160 may display the determined target object. The processor 120 may provide visual data indicating that the target object is determined by the user input. For example, as shown in FIG. 5B, to indicate that the object corresponding to "me" is selected by the user input 561, the processor 120 may control the display device 160 to change a line thickness, a color, or a shape corresponding bounding box 571, or to further display information 573 indicating the synthesis target near the corresponding bounding box 571. The processor 120 may remove the bounding box 553 indicating the object not selected by the user input 561.

In FIG. 5A and FIG. 5B described above, if the first image includes the plurality of the main objects, to indicate the plurality of the main objects detected, the electronic device 101 displays the visual data such as the bounding box, but it may display visual data indicating one main object detected if the first image includes one main object. The electronic device 101 may display the visual data indicating one main object detected, and determine the detected main object as the target object, based on a user input for selecting the detected main object.

Figure 6A:
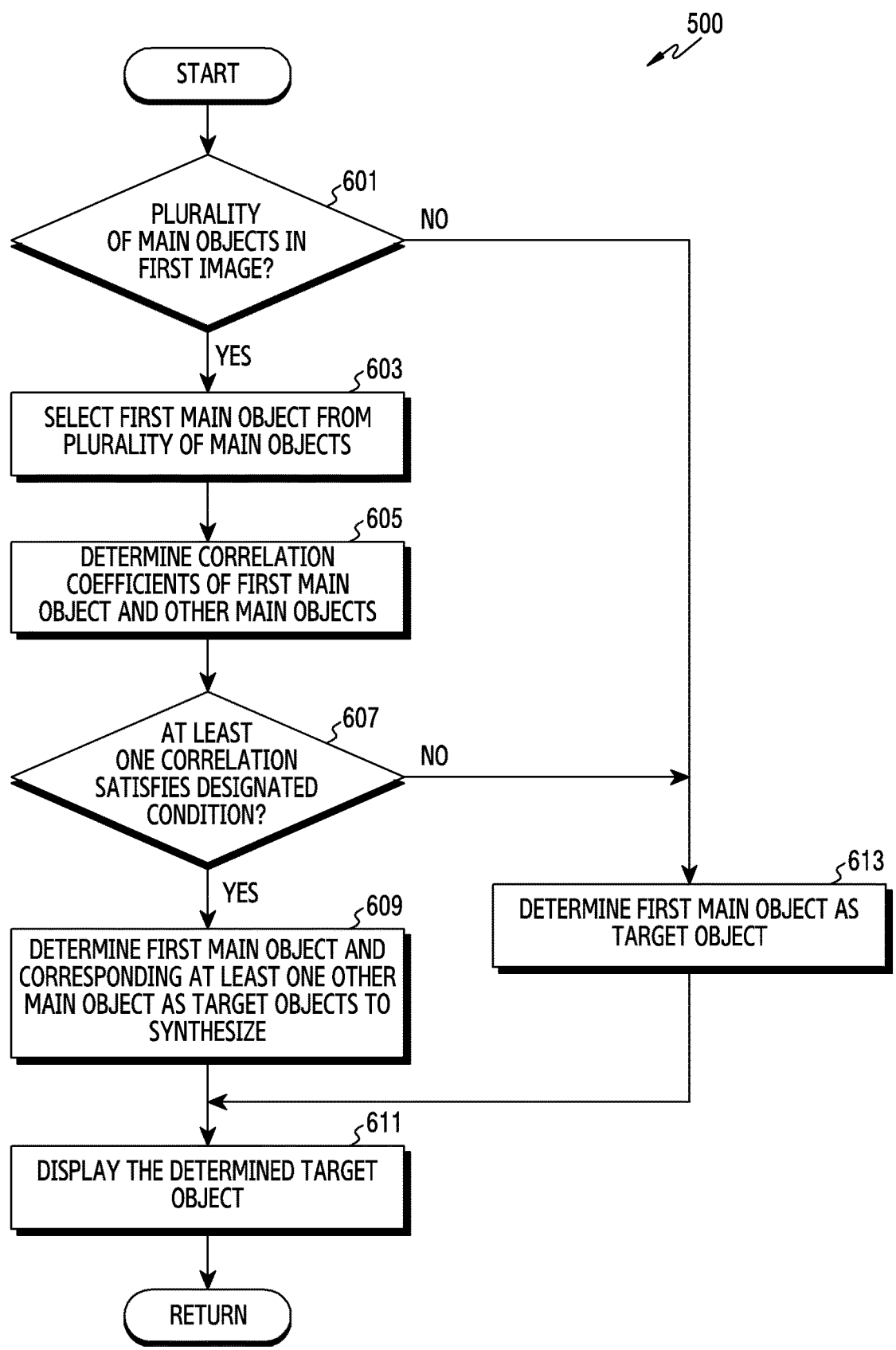
FIG. 6A is a flowchart of a method for determining a synthesis target object based on correlation of objects in an image in an electronic device according to various embodiments.
Figure 6B:
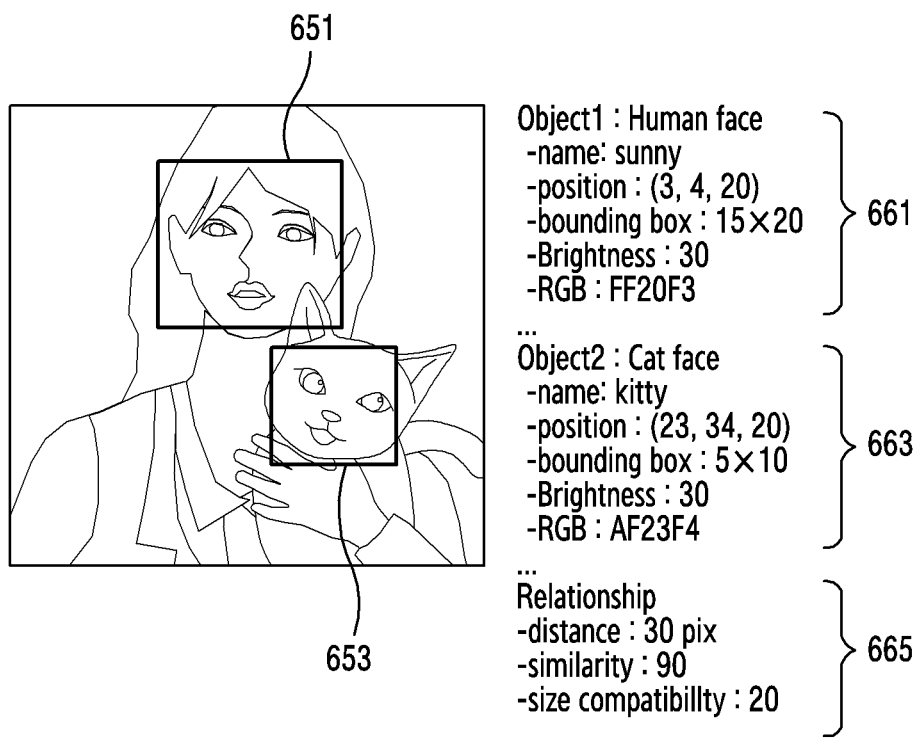
FIG. 6B is a diagram for determining the synthesis target object based on the correlation of the objects in the image in the electronic device according to an embodiment.

FIG. 6A is a flowchart 600 of a method for determining a synthesis target object based on correlation of objects in an image in an electronic device according to an embodiment. The operations of FIG. 6A may be at least some of the detailed operations of operation 301 of FIG. 3 or operation 409 of FIG. 4A. The operations may be performed sequentially, but not necessarily. For example, the order of the operations may be changed, and at least two operations may be performed in parallel. Herein, the electronic device may be the electronic device 101 of FIG. 1. At least some operation of FIG. 6A shall be described with reference to FIG. 6B. FIG. 6B is a diagram for determining the synthesis target object based on the correlation of the objects in the image in the electronic device according to an embodiment.

Referring to FIG. 6A, in operation 601, the electronic device (or the processor 120 of FIG. 1) according to an embodiment may determine whether a first image includes a plurality of main objects. 'operation 601 may include the same operation as operation 501 of FIG. 5A.

According to an embodiment, in response to determining there is only one main object in the first image, the processor 120 may determine a first main object which is the one main object, as the target object in operation 613. For example, if the first image includes only the first main object, the processor 120 may determine the first main object as the target object to synthesize.

According to an embodiment, if the first image includes a plurality of main objects, the processor 120 and/or the display device 160 may determine correlation of the first main object and other main objects in operation 603. The processor 120 may determine one of the main objects of the first image as the first main object. The first main object may be determined based on at least one of the user preference information, sizes of the main objects, or positions of the main objects. For example, the processor 120 may determine a main object corresponding to the user preference information among the main objects of the first image, as the first main object. For example, the processor 120 may determine the main object of the greatest size among the main objects of the first image, as the first main object. For example, the processor 120 may determine a main object at a center area of the first image among the main objects of the first image, as the first main object. The processor 120 may determine the correlation between the first main object and other main objects. The processor 120 may determine the correlation between the first main object and other main objects, based on data stored in the memory 130 and/or the internal storage 210 of the electronic device. For example, by analyzing image data stored in the image data DB 212 of the internal storage 210, the processor 120 may determine the correlation including a correlation coefficient between the first main object and other main object. The correlation coefficient may be a value indicating the similarity or the association of the first main object and other main object. The correlation coefficient of the first main object and other main object may be determined based on at least one of the number of images including the first main object and other main object among the image data stored in the image data DB 212, or the association of the first main object and other main object acquired by analyzing the images including the first main object and other main object. The association of the first main object and other main object may be obtained using the relation extractor. For example, the processor 120 may retrieve information indicating the correlation of the first main object and other main object from the correlation DB 214 of the internal storage 210. For example, the processor 120 may determine information indicating the correlation of the first main object and other main object based on the data stored in the user data DB 216 of the internal storage 210.

According to an embodiment, in operation 607, the processor 120 may determine whether the correlation of the first main object and at least one other main object satisfies a designated condition. For example, if the first image includes three main objects, the processor 120 may determine whether at least one of correlation of the first main object and the second main object and correlation of the first main object and third second main object satisfies the designated condition. If the correlation coefficient in the correlation of the first main object and the other main object is greater than a designated value, the processor 120 may determine that the correlation of the first main object and the other main object satisfies the designated condition. If the correlation coefficient in the correlation of the first main object and the other main object is smaller than or equal to the designated value, the processor 120 may determine that the correlation of the first main object and the other main object does not satisfy the designated condition.

According to an embodiment, if the correlation of the first main object and the at least one other main object does not satisfy the designated condition, the processor 120 may determine only the first main object as the target object in operation 613. For example, if the first image includes a plurality of main objects but the similarity or the association of the first main object and other main object is low, the processor 120 may determine the first main object as the target object to synthesize.

According to an embodiment, if the correlation of the first main object and the other main object satisfies the designated condition, the processor 120 may determine the first main object and at least one other main object as the target objects to synthesize in operation 609. For example, if the correlation coefficient of the first main object and the second main object is greater than the designated value, the processor 120 may determine the first main object and the second main object as the target objects to synthesize.

According to an embodiment, in operation 611, the processor 120 and/or the display device 160 may further display graphic data indicating the determined target object on the first image. For example, as shown in FIG. 6B, to indicate that the first main object corresponding to "me" and the second main object corresponding to "cat" are selected as the target objects to synthesize, the processor 120 may further display bounding boxes 651 and 653 indicating specific areas of "me" and "cat" on the first image. For example, if displaying in advance the bounding boxes 651 and 653 indicating the main objects in the first image, the processor 120 may change at least one of the line thickness, the color, or the shape of the displayed bounding boxes 651 and 653, and thus indicate that "me" and "cat" are determined to be the target objects to synthesize to the second image. The processor 120 may additionally display information of the main objects in the first image, and the correlation information of the first main object and the other object. For example, as shown in FIG. 6B, the processor 120 may display on the display, information 661 of the first main object corresponding to "me" information 663 of the second main object corresponding to "cat", and information 665 indicating the correlation between the first main object and the second main object.

Figure 7:
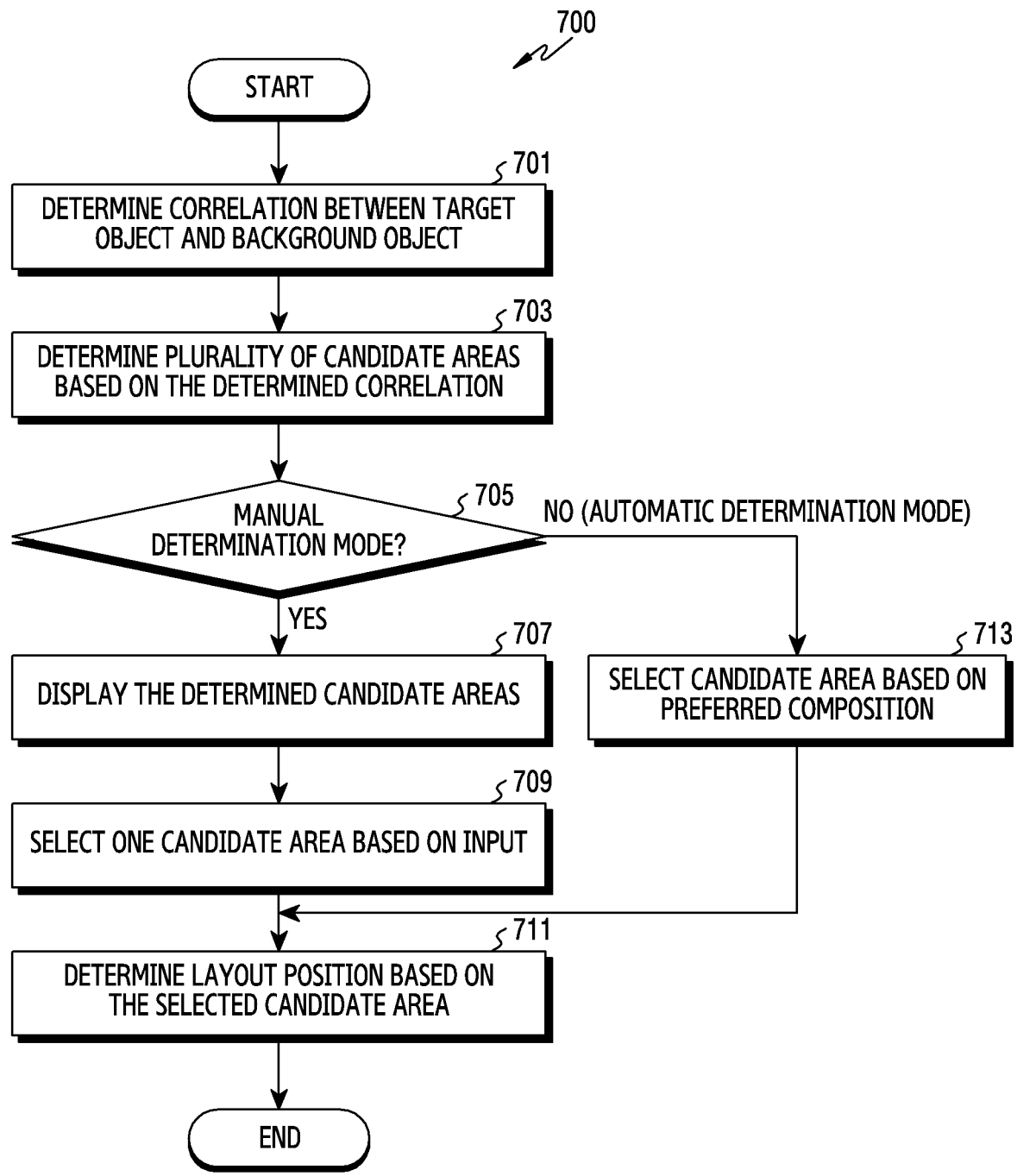
FIG. 7 is a flowchart of a method for determining a layout position of a synthesis target object in an electronic device according to an embodiment.
Figure 8:
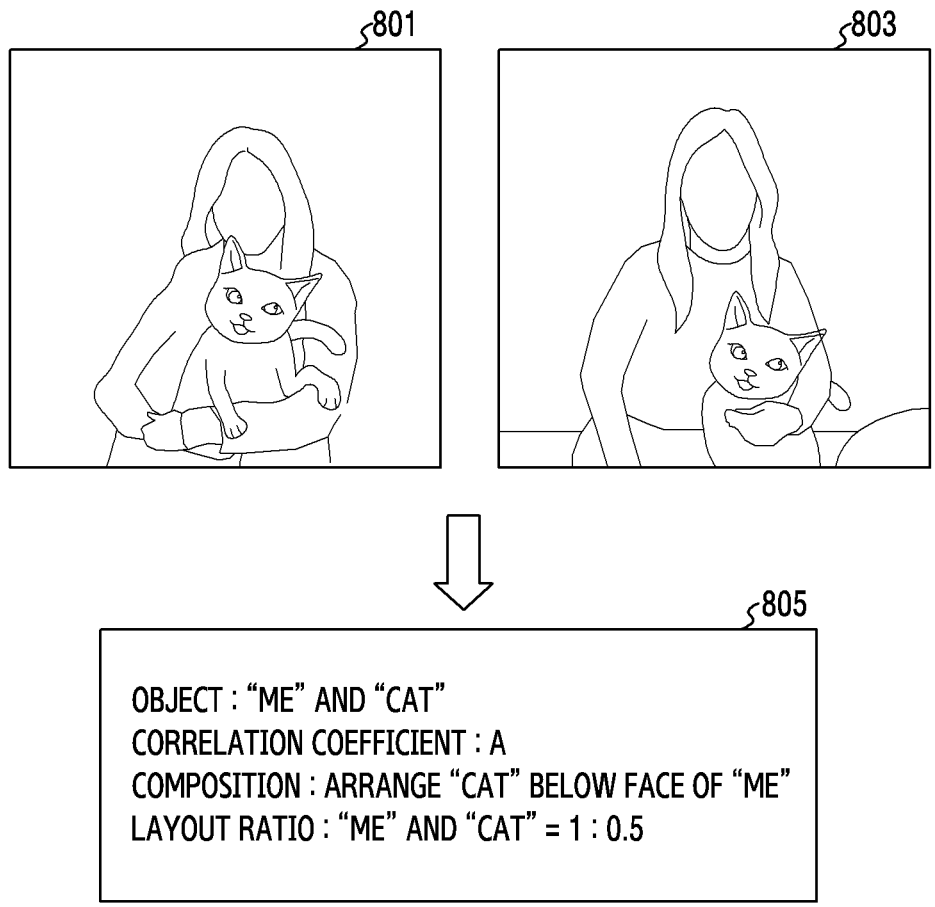
FIG. 8 is a diagram illustrating user preference information including correlation between objects based on pre-stored images in an electronic device according to an embodiment.
Figure 9A:
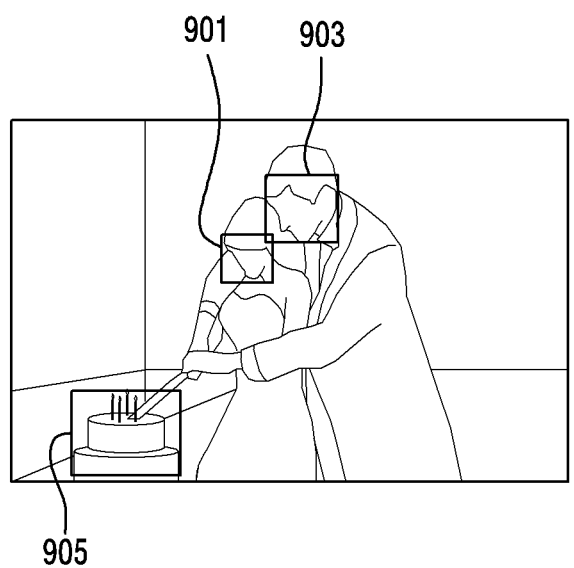
FIG. 9A is a diagram for assigning a weight to a candidate area using image-to-text conversion in an electronic device according to an embodiment.
Figure 9B:
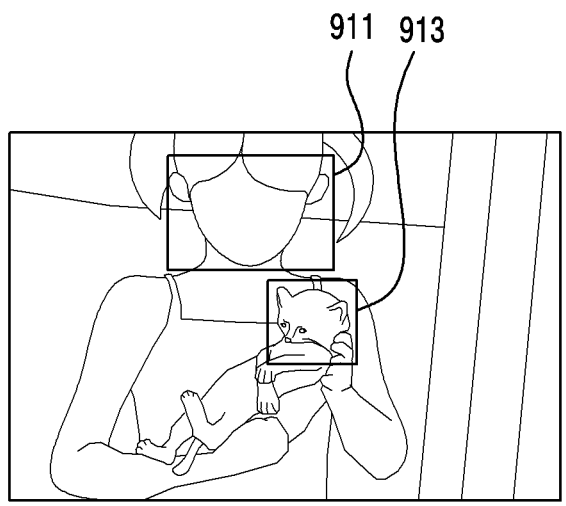
FIG. 9B is a diagram for assigning the weight to the candidate area using the image-to-text conversion in the electronic device according to an embodiment.
Figure 10:
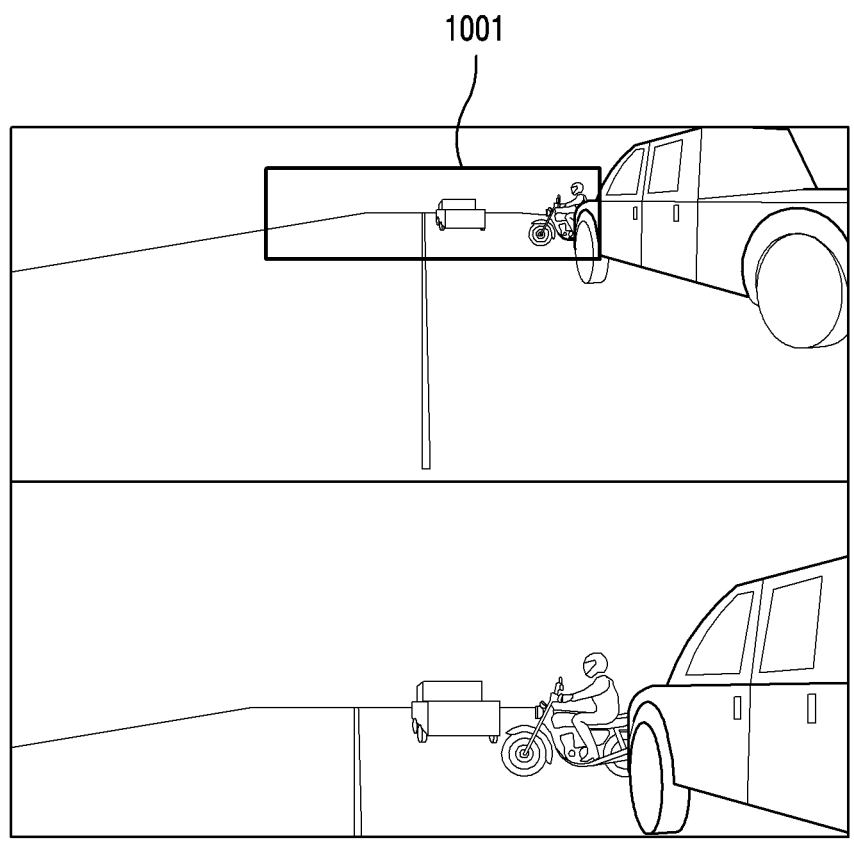
FIG. 10 is a diagram for guiding a candidate area based on an attention algorithm in an electronic device according to an embodiment.
Figure 11:
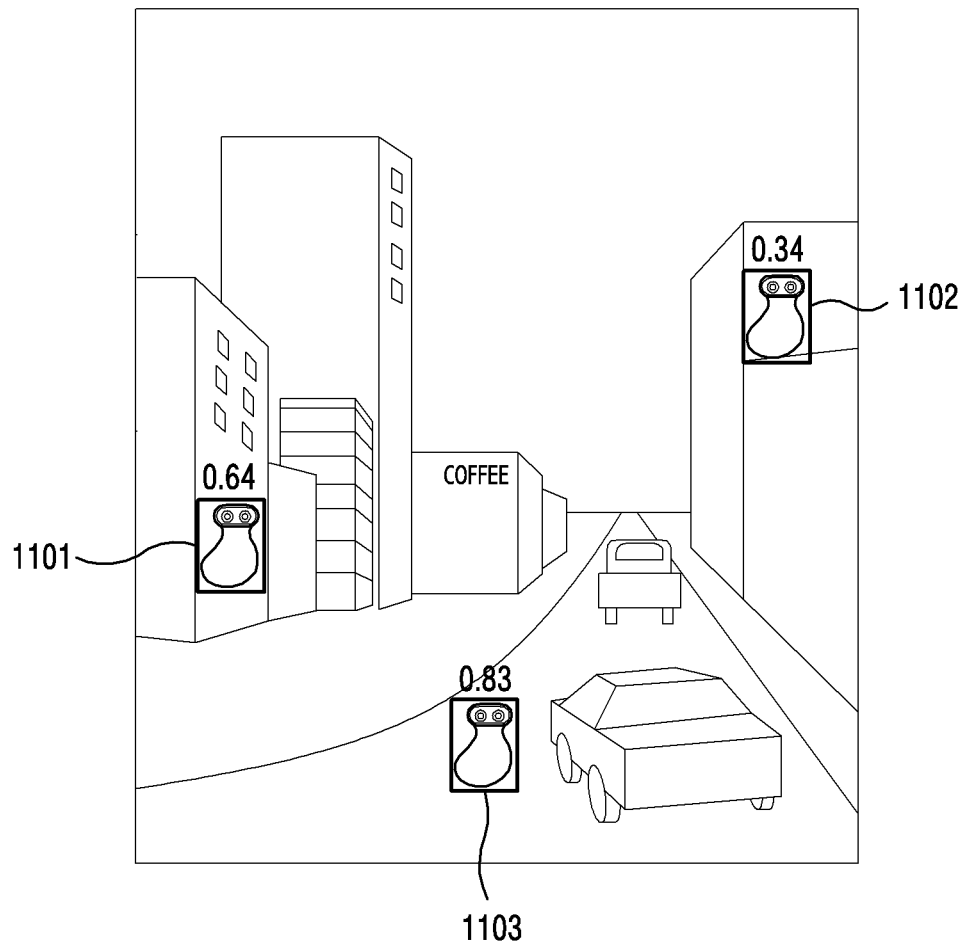
FIG. 11 is a diagram illustrating similarity of background objects in relation to a target object in an electronic device according to an embodiment.

FIG. 7 is a flowchart 700 of a method for determining a layout position of a synthesis target object in an electronic device according to an embodiment. The operations of FIG. 7 may be at least some of the detailed operations of operation 301 of FIG. 3. The operations may be performed sequentially, but not necessarily. For example, the order of the operations may be changed, and at least two operations may be performed in parallel. Herein, the electronic device may be the electronic device 101 of FIG. 1. At least some operation of FIG. 7 shall be described with reference to FIG. 8 through FIG. 11. FIG. 8 is a diagram for illustrating user preference information including correlation between objects based on prestored images in an electronic device according to embodiment. FIG. 9A and FIG. 9B are diagrams for assigning a weight to a candidate area using image-to-text conversion in an electronic device according to an embodiment. FIG. 10 is a diagram for guiding a candidate area based on an attention algorithm in an electronic device according to an embodiment. FIG. 11 is a diagram illustrating similarity of background objects in relation to a target object in an electronic device according to an embodiment.

Referring to FIG. 7, in operation 701, the electronic device (or the processor 120 of FIG. 1) according to an embodiment may determine correlation between a target object and a background object. The processor 120 may determine the correlation between the target object and the background object based on user preference information. The user preference information may include data stored in the memory 130 and/or the internal storage 210 of the electronic device 101. For example, the user preference information may include data stored in at least one of the image data DB 212, the correlation DB 214, or the user data DB 216 of the internal storage 210. The correlation may include a correlation coefficient indicating at least one of similarity or association between the target object and each background object. The correlation information may include the correlation coefficient for the target object and each background object, and the user preference information for the target object and each background object. The user preference information may include at least one of preferred composition information for the target object and the background object, preferred ratio information for the target object and the background object, preferred color information for the target object and the background object, preferred place information for the target object and the background object, preferred filter information for the target object and the background object, preferred distance information for the target object and the background object, preferred light direction information for the target object and the background object, or preferred time information for the target object and the background object. The user preference information may include at least one of the user preference information of the electronic device 101, or preference information of at least one other user corresponding to at least one other external device (e.g., the electronic device 102 or 104 of FIG. 1). Based on the data stored in the memory of the electronic device 101, the processor 120 may obtain the user preference information of the target object and the background object. For example, as shown in FIG. 8, the processor 120 may analyze images 801 and 803 stored in the image data DB 212 and thus obtain information 805 indicating the correlation of the target object "cat" and the background object "me". The correlation information 805 of the target object "cat" and the background object "me" may include at least one of a correlation coefficient, composition, or a layout ratio. The composition or the layout ratio may be user preferred composition or a user preferred layout ratio.

According to an embodiment, using image-to-text conversion, the processor 120 may obtain data indicating features of a second image, and update the correlation coefficient of the target object and the background object based on the obtained data. For example, the processor 120 may analyze the second image as shown in FIG. 9A, determine the image indicating features that a groom 903 and a bride 901 are cutting a cake 905, and acquire data "subject: groom and bride, verb: cut, object: cake" indicating the features of the second image. The processor 120 may apply a weight to the correlation coefficient of at least one background object corresponding to at least one of the subject, the verb, and the object among a plurality of background objects in the second image. The background object corresponding to the subject may be the groom 903 and the bride 901, the background object corresponding to the verb may be hands of the groom and/or the bride cutting the cake, and the background object corresponding to the object may be the cake 905. For example, the processor 120 may determine an image indicating features that a child 911 is holding a cat 913 by analyzing the second image as shown in FIG. 9B, and acquire data "subject: child, verb: hold, object: cat" indicating the features of the second image. The processor 120 may apply a weight to the correlation coefficient of at least one background object corresponding to at least one of the subject, the verb, and the object among a plurality of background objects in the second image. The background object corresponding to the subject may be the child 911, the background object corresponding to the verb may be child's 911 arms holding the cat 913, and the background object corresponding to the object may be the cat 913.

According to an embodiment, the processor 120 may determine a plurality of candidate layout areas based on the determined correlation in operation 703. The processor 120 may select at least one background object of the highest correlation coefficient among the background objects in the second image, and determine the plurality of the candidate layout areas based on the selected background objects. The processor 120 may select a designated number of background objects of the highest correlation coefficient among the background objects in the second image, or select at least one background object having a greater correlation coefficient than a designated number among the background objects in the second image. The candidate layout area may include at least one of an area including at least part of the selected background object, or at least one area adjacent to the selected background object. For example, the candidate layout area may include at least part of a left area, a right area, an upper area, or a lower area adjacent to the selected background object. For example, if correlation coefficients of background objects "me", "tree", "grass" in relation to a target object "dog" are 0.95, 0.54, and 0.32 respectively, the processor 120 may select "me" of the greatest correlation coefficient, and determine a first area indicating an area corresponding to the body in the area of the background object "me" in the second image, a second area indicating a left lower area adjacent to the background object "me", and a third area indicating a right lower area adjacent to the background object "me", as the candidate layout areas. The processor 120 may apply a weight to at least one of the candidate layout areas using the attention algorithm. For example, as shown in FIG. 10, the processor 120 may apply a weight to a candidate layout area 1001 not overlapping the main features of the second image among the plurality of the candidate layout areas, and thus update the correlation coefficient of the corresponding candidate layout area 1001 with a greater value.

According to an embodiment, the processor 120 may determine whether a layout position determination mode is set to a manual determination mode in operation 705. The processor 120 may determine whether the layout position determination mode is the manual determination mode or an automatic determination mode. The manual determination mode may determine a final layout position based on a user input. The automatic determination mode may determine the final layout position without a user input.

According to an embodiment, if the layout position determination mode is set to the manual determination mode, the processor 120 may display the determined candidate layout areas in operation 707. The processor 120 may display graphic data indicating the determined candidate layout areas on the second image. The graphic data indicating the determined candidate layout areas may be a bounding box including some of the second image, and may be overlaid on the second image. The processor 120 may display a correlation coefficient corresponding to the candidate layout area together with the graphic data indicating the determined candidate layout areas on the second image. For example, as shown in FIG. 11, the processor 120 may display a first candidate area 1101, a second candidate area 1102, and a third candidate area 1103 on the second image, and additionally display correlation coefficients 0.64, 0.34 and 0.83 corresponding to the candidate layout areas, respectively. The correlation coefficient corresponding to the candidate layout area may be the correlation coefficient of the background object corresponding to the candidate layout area and the target object to be synthesized to the second image. The background object corresponding to the candidate layout area may be a background object in the candidate layout area, or the background object adjacent to the candidate layout area.

According to an embodiment, the processor 120 may select one of the candidate layout areas based on a user input in operation 709. For example, the processor 120 may detect the user input which selects one of the candidate layout areas, and identify the candidate layout area selected by the user input. The selected candidate layout area may be a final layout area.

According to various embodiments, if the layout position determination mode is not set to the manual determination mode (is set to the automatic determination mode), the processor 120 may select one of the candidate layout areas based on the user preferred composition in operation 709. For example, based on the user preferred composition information in the correlation of the target object and the selected background object, the processor 120 may select one of the candidate layout areas. For example, if the preferred composition of "dog" and "me" arranges "dog" at the body portion of "me", the processor 120 may select a first area indicating the body area of the background object area "me" from the candidate layout areas in the second image. The processor 120 may select one of the candidate layout areas, by further considering at least one of the main features of the second image, or the light direction. For example, the processor 120 may select one of the candidate layout areas, corresponding to the preferred composition information and not overlapping the main features of the second image. If the candidate layout areas does not include the candidate layout area corresponding to the user preferred composition, the processor 120 may select the candidate layout area of the highest correlation coefficient. For example, as shown in FIG. 11, the processor 120 may select the third candidate area 1103 of the highest correlation coefficient 0.83 from the first candidate area 1101, the second candidate area 1102, and the third candidate area 1103 displayed on the second image. The selected candidate layout area may be the final layout area.

The processor 120 may determine a layout position for synthesizing the target object based on the selected candidate layout area in operation 711. The layout position for synthesizing the target object may indicate at least one coordinates corresponding to the selected candidate layout area (or the final layout area). The layout area may include, for example, at least one set of coordinates corresponding to a center area of the selected candidate layout area, at least one set of coordinates corresponding to a boundary of the selected candidate layout area, or at least one set of coordinates corresponding to the whole selected candidate layout area.

Figure 12:
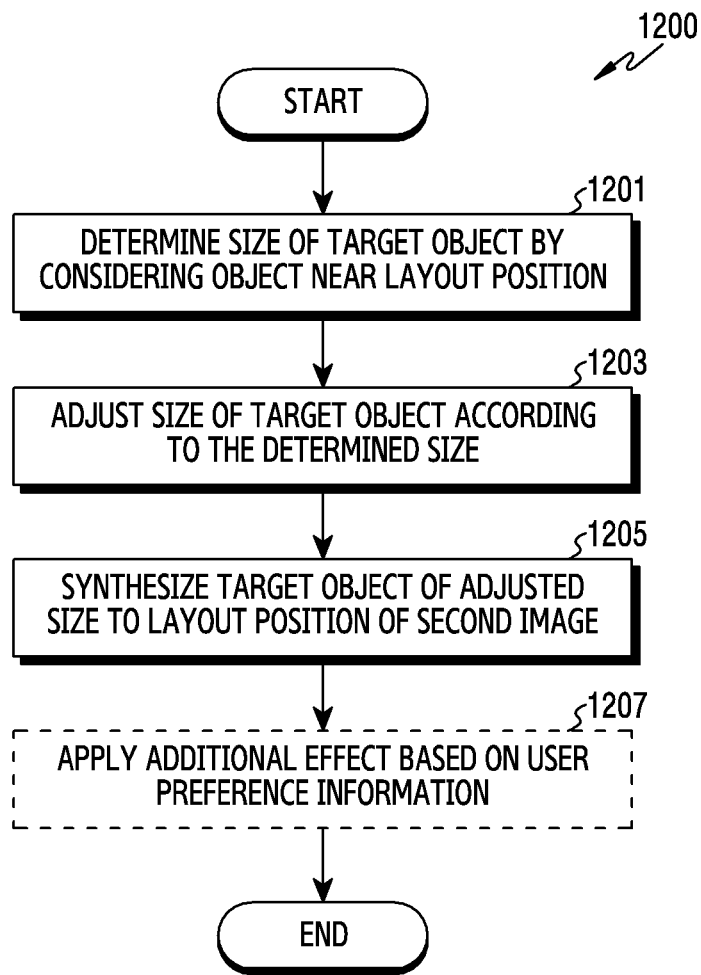
FIG. 12 is a flowchart of a method for synthesizing a target object to a second image based on an object near a determined layout position in an electronic device according to an embodiment.
Figure 13:
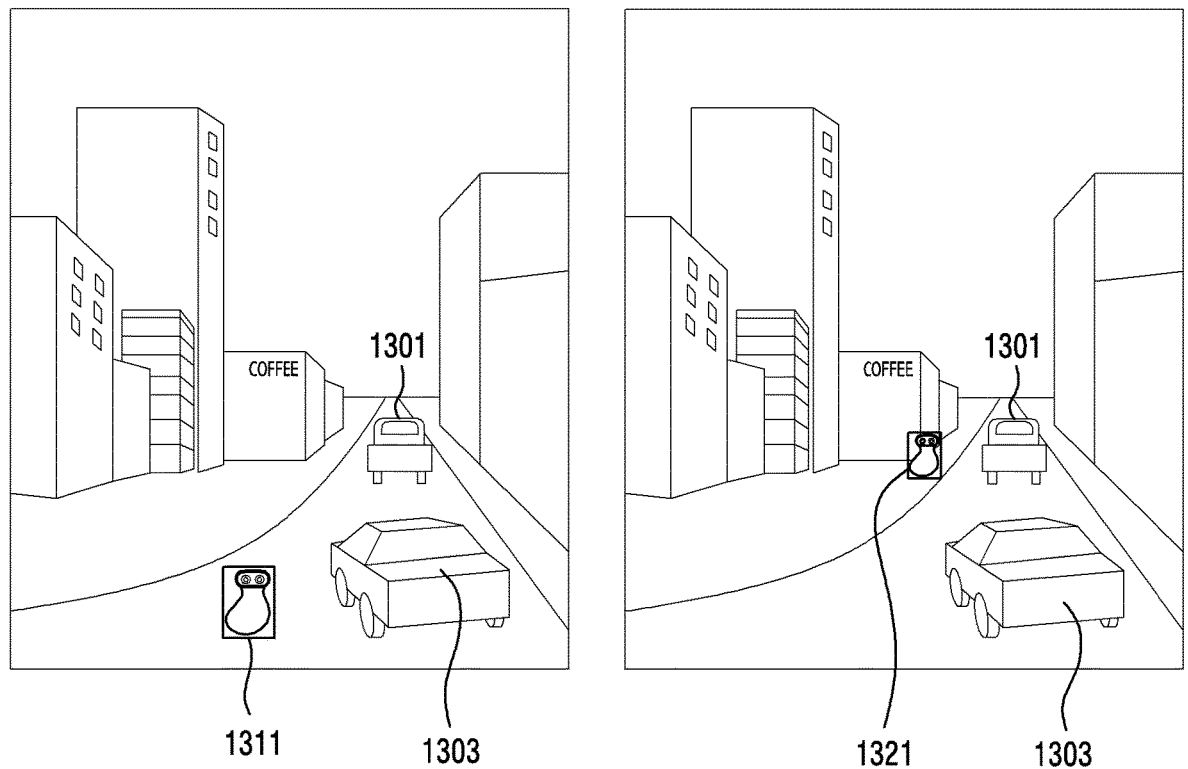
FIG. 13 is a diagram for adjusting a size of a target object based on an ambient object in an electronic device according to an embodiment.
Figure 14:
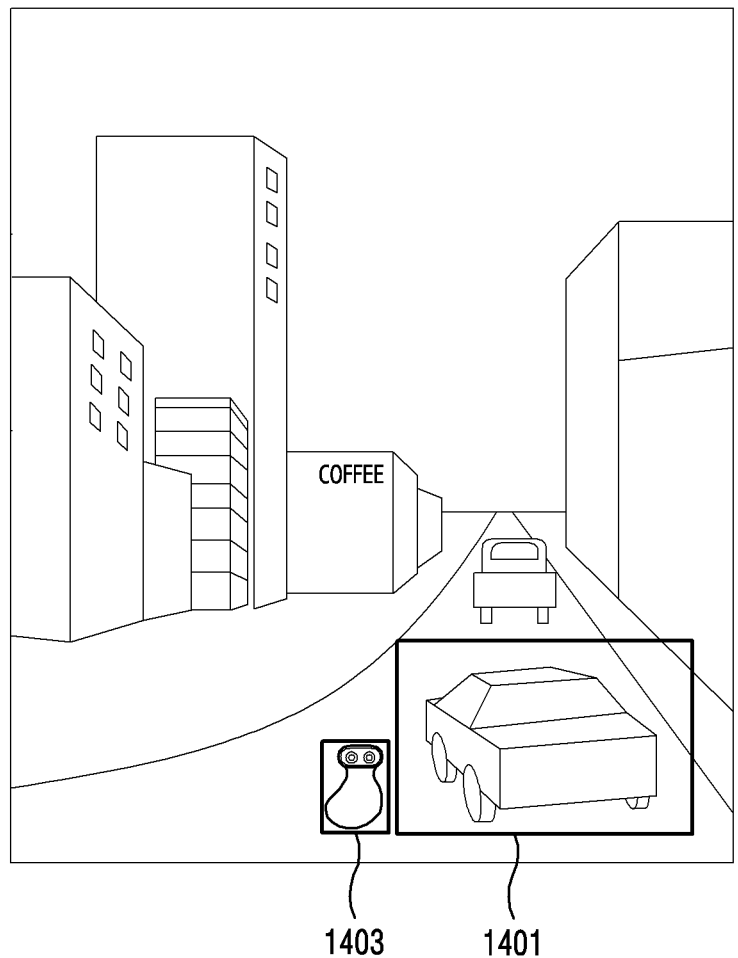
FIG. 14 is a diagram for arranging a target object based on a background object near a layout position in an electronic device according to an embodiment.

FIG. 12 is a flowchart 1200 of a method for synthesizing a target object to a second image based on an object around a determined layout position in an electronic device according to an embodiment. The operations of FIG. 12 may be at least some of the detailed operations of operation 305 of FIG. 3. The operations may be performed sequentially, but not necessarily. For example, the order of the operations may be changed, and at least two operations may be performed in parallel. Operation 1207 outlined with a dotted line may be omitted in FIG. 12 according to an embodiment. Herein, the electronic device may be the electronic device 101 of FIG. 1. At least some operation of FIG. 12 shall be described with reference to FIG. 13 and FIG. 14. FIG. 13 is a diagram for adjusting a size of a target object based on an ambient object in an electronic device according to embodiment. FIG. 14 is a diagram for arranging a target object based on a background object near a layout position in an electronic device according to an embodiment.

Referring to FIG. 12, in operation 1201, the electronic device (or the processor 120 of FIG. 1) according to an embodiment may determine a size of a target object by considering an ambient object close to a layout position. The processor 120 may identify features of the ambient object close to the layout position, and determine whether the features of the ambient object correspond to the main features of the second image. If the features of the ambient object close to the layout position correspond to the main features of the second image, the processor 120 may determine the size of the target object not to hide the features of the ambient object. The processor 120 may retrieve correlation information of the ambient object close to the layout position and the target object from the correlation DB 214, and further adjust the size of the target object based on the retrieved correlation information. For example, the processor 120 may obtain the correlation information of the ambient object close to the layout position and the target object, and further adjust the size of the target object, based on at least one of the preferred size ratio or the preferred layout distance in the obtained correlation information. The processor 120 may determine the size of the target object based on a size of the ambient object close to the layout position. For example, as shown in FIG. 13, if the second image includes a first background object 1301 and a second background object 1303 in different sizes and the ambient object close to the layout position is the second background object 1303, the processor 120 may determine a size of a target object 1311 to A based on the size of the second background object 1303. If the ambient object close to the layout position is the first background object 1301, the processor 120 may determine the size of the target object 1321 to B which is smaller than A based on the size of the first background object 1301.

According to an embodiment, in operation 1203, the processor 120 may adjust the size of the target object according to the determined size. For example, based on the determined object size, the processor 120 may increase or decrease the size of the target object obtained from the first image.

According to an embodiment, in operation 1205, the processor 120 may synthesize the target object of the adjusted size to the layout position of the second image. The processor 120 may acquire a synthesized third image, by arranging the target object of the adjusted size to the layout position of the second image. The processor 120 may determine a specific position for synthesizing the target object based on the retrieved correlation information, and arrange the target object to the determined specific position. The specific position may include an accurate position for arranging the target object based on the determined layout position. For example, as shown in FIG. 14, the processor 120 may determine a specific position of a target object 1403 to align a lower portion of an object 1401 corresponding to the layout position (or an object near the layout position) and a lower portion of the target object 1403, and arrange the target object 1403 at the determined specific position.

According to an embodiment, in operation 1207, the processor 120 may apply an additional effect based on the user preference information. The processor 120 may determine at least one effect based on the user preference information, and apply at least one effect to the whole, or at least part of, the third image. The at least part of the third image applied with the at least one effect may be the area where the target object is arranged in the third image. The at least one effect may include at least one of apply filter, change color, or adjust brightness. The at least one effect may be determined based on at least one of the image data DB 212, the correlation DB 214, or the user data DB 216. For example, the processor 120 may detect images including the target object among the images stored in the image data DB 212, determine a user's favorite effect by analyzing effects applied to the detected images, and apply the determined effect to the target object or at least part of the synthetic image of the target object. For example, based on the data stored in the user data DB 216, the processor 120 may determine an effect mostly applied by the user in capturing the object, and apply the determined effect to the target object or at least part of the synthetic image of the target object. The processor 120 may display a list of the determined at least one effect on the display device 160, and apply an effect selected in the displayed list based on a user input to the synthetic image.

According to an embodiment, an operating method of an electronic device may include identifying at least one target object in a first image, and at least one background object in a second image, determining a position for arranging the at least one target object on the second image, based on correlation of the at least one target object identified and the at least one background object identified, obtaining a third image by arranging the at least one target object based on the determined position on the second image, and displaying the obtained third image on a display.

Determining the position for arranging the at least one target object on the second image based on the correlation may include obtaining correlation information relating to the at least one target object and the at least one background object based on at least one of images or user data stored in a memory of the electronic device, and the correlation information may include a correlation coefficient indicating at least one of similarity or association for the at least one target object and the at least one background object.

Obtaining the third image may include, based on the correlation information, determining at least one of composition, a layout distance, or a ratio with respect to the at least one target object and the at least one background object, and arranging the at least one target object at the determined position on the second image further based on at least one of the determined composition, layout distance, or ratio, wherein the correlation information may include at least one of preferred composition, a preferred layout distance, a preferred ratio, a preferred color, a preferred filter, or preferred brightness for each of the at least one target object and the at least one background object.

Determining the position for arranging the at least one target object on the second image may include determining at least one main background object indicating features of the second image among the at least one background object, determining at least one candidate area not overlapping the determined main background object, and determining the position for arranging the at least one target object on the second image based on the determined at least one candidate area.

Identifying at least one target object in the first image may include, if a plurality of objects indicates the features of the first image, determining a first main object based on the features of the first image among the plurality of the objects, determining a correlation coefficient of the first main object and other object of the plurality of the objects, if the determined correlation coefficient satisfies a designated value, determining the first main object and the other object as target objects to be synthesized with the second image, and if the correlation coefficient does not satisfy the designated value, determining only the first main object as the target object to be synthesized with the second image.

Determining the position for arranging the at least one target object on the second image may include, based on correlation for the at least one target object and the at least one background object, determining a plurality of candidate layout areas for arranging the at least one target object, displaying graphic data indicating the determined candidate layout areas on the second image, determining one of the candidate layout areas, based on a user input, and determining the position for arranging the at least one target object on the object based on the determined candidate layout area.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. The electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Herein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

A method according to an embodiment of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to an embodiment, each component (e.g., a module or a program) of the above-described components may include a single entity or multiple entities. According to an embodiment, one or more of the above-described components may be omitted, or one or more other components may be added. Alternatively or additionally, a plurality of components (e.g., modules or programs) may be integrated into a single component. In such a case, according to an embodiment, the integrated component may still perform one or more functions of each of the plurality of components in the same or similar manner as they are performed by a corresponding one of the plurality of components before the integration. According to an embodiment, operations performed by the module, the program, or another component may be carried out sequentially, in parallel, repeatedly, or heuristically, or one or more of the operations may be executed in a different order or omitted, or one or more other operations may be added.

An electronic device according to an embodiment of the disclosure may determine a synthesis position of a target object based on correlation between the target object in a first image and a background object in a second image, and thus enhance user satisfaction by minimizing a user input for the image synthesis. In addition, the electronic device according to an embodiment of the disclosure may acquire a natural synthetic image considering user's preference, by controlling at least one of a position, a size, brightness, a ratio, a filter applied, or a color of the target object based on the correlation between the target object in the first image and the background object in the second image.

Various embodiments of the disclosure allow various modifications. Thus, the scope of the disclosure is not limited and defined by the described embodiment, and should be defined by not only the scope of the claims as below but also their equivalents.

What is claimed is:

1. An electronic device comprising:
   a display;
   a processor operatively coupled to the display; and
   a memory operatively coupled to the processor, wherein the memory is configured to store at least one of images and user data, and wherein the memory stores instructions, which when executed, cause the processor to:

identify at least one target object in a first image, and at least one background object in a second image, determine a position for arranging the at least one target object on the second image, based on correlation information of the at least one identified target object and the at least one identified background object, obtain a third image by arranging the at least one target object based on the determined position on the second image, and display the obtained third image on the display, wherein the correlation information is generated based on at least one of the images and the user data, and wherein the correlation information includes at least one of a similarity, an association and user preferences related to at least one of a position of the at least one identified target object or a position of the at least one identified background object.

2. The electronic device of claim 1, wherein the instructions further cause the processor to obtain the correlation information relating to the at least one target object and the at least one background object based on at least one of the images or the user data, and wherein the correlation information comprises a correlation coefficient indicating at least one of the similarity or the association.

3. The electronic device of claim 2, wherein the correlation information comprises at least one of preferred composition, a preferred layout distance, a preferred ratio, a preferred color, a preferred filter, or preferred brightness with respect to each of the at least one target object and the at least one background object.

4. The electronic device of claim 3, wherein the instructions further cause the processor to:

based on the correlation information, determine at least one of the composition, the layout distance, or the ratio with respect to the at least one target object and the at least one background object, and arrange the at least one target object at the determined position on the second image further based on at least one of the determined composition, layout distance, or ratio.

5. The electronic device of claim 1, wherein the instructions further cause the processor to:

obtain feature information of the second image, and determine the position for arranging the at least one target object on the second image based on the obtained feature information.

6. The electronic device of claim 5, wherein the instructions further cause the processor to:

determine at least one main background object indicating features of the second image among the at least one background object, determine at least one candidate area not overlapping the determined main background object, and determine the position for arranging the at least one target object on the second image based on the determined at least one candidate area.

7. The electronic device of claim 1, wherein the instructions further cause the processor to:

identify at least one object in the first image by analyzing the first image, and determine at least one object indicating features of the first image among the identified at least one object, as the at least one target object.

8. The electronic device of claim 7, wherein the instructions further cause the processor to:

control the display to display graphic data notifying at least one object indicating the features of the first image among the identified at least one object, and determine at least one object selected by a user input to be the at least one target object among at least one object indicating the features of the first image.

9. The electronic device of claim 7, wherein the instructions further cause the processor to:

if a plurality of objects indicates the features of the first image, determine a first main object based on the features of the first image among the plurality of the objects, determine a correlation coefficient of the first main object and other object of the plurality of the objects, if the determined correlation coefficient satisfies a designated value, determine the first main object and the other object as target objects to be synthesized with the second image, and if the determined correlation coefficient does not satisfy the designated value, determine only the first main object as the target object to be synthesized with the second image.

10. The electronic device of claim 1, wherein the instructions further cause the processor to:

identify at least one object in the second image by analyzing the second image, and determine at least one object indicating features of the second image as the at least one background object among the identified at least one object.

11. The electronic device of claim 10, wherein the instructions further cause the processor to:

based on correlation for the at least one target object and the at least one background object, determine a plurality of candidate layout areas for arranging the at least one target object, control the display to display graphic data indicating the determined candidate layout areas on the second image, determine one of the candidate layout areas, based on a user input, and determine a position for arranging the at least one target object on the second image based on the determined candidate layout area.

12. The electronic device of claim 10, wherein the instructions further cause the processor to:

determine one of the candidate layout areas, based on preferred composition for the target object and the at least one background object, and determine the position for arranging the at least one target object on the second image based on the determined candidate layout area.

13. The electronic device of claim 1, wherein the instructions further cause the processor to:

identify an ambient object adjacent to the determined position on the second image, adjust a size of the at least one target object, based on a size of the identified ambient object, and obtain the third image by arranging the at least one target object of the adjusted size at the determined position on the second image.

14. The electronic device of claim 1, wherein the instructions further cause the processor to:
apply a graphic effect to at least part of the third image, based on user preference information obtained from at least one of the memory or an external device,
wherein the graphic effect comprises at least one of adjust color, apply filter, or control brightness.

15. An operating method of an electronic device, comprising:
identifying at least one target object in a first image, and at least one background object in a second image;
determining a position for arranging the at least one target object on the second image, based on correlation information of the at least one identified target object and the at least one identified background object;
obtaining a third image by arranging the at least one target object based on the determined position on the second image; and
displaying the obtained third image on a display,
wherein the correlation information is generated based on at least one of images and user data stored in a memory of the electronic device, and
wherein the correlation information includes at least one of a similarity, an association and user preferences related to at least one of a position of the at least one identified target object or a position of the at least one identified background object.

16. The method of claim 15, wherein determining the position for arranging the at least one target object on the second image based on the correlation comprises:
obtaining the correlation information relating to the at least one target object and the at least one background object based on at least one of the images or the user data,
wherein the correlation information comprises a correlation coefficient indicating at least one of the similarity or the association.

17. The method of claim 15, wherein obtaining the third image comprises:
based on the correlation information, determining at least one of composition, a layout distance, or a ratio with respect to the at least one target object and the at least one background object; and
arranging the at least one target object at the determined position on the second image further based on at least one of the determined composition, layout distance, or ratio,
wherein the correlation information comprises at least one of preferred composition, a preferred layout distance, a preferred ratio, a preferred color, a preferred filter, or preferred brightness for each of the at least one target object and the at least one background object.

18. The method of claim 15, wherein determining the position for arranging the at least one target object on the second image comprises:
determining at least one main background object indicating features of the second image among the at least one background object;
determining at least one candidate area not overlapping the determined main background object; and
determining the position for arranging the at least one target object on the second image based on the determined at least one candidate area.

19. The method of claim 15, wherein identifying at least one target object in the first image comprises:
if a plurality of objects indicates the features of the first image, determining a first main object based on the features of the first image among the plurality of the objects;
determining a correlation coefficient of the first main object and other object of the plurality of the objects;
if the determined correlation coefficient satisfies a designated value, determining the first main object and the other object as target objects to be synthesized with the second image; and
if the correlation coefficient does not satisfy the designated value, determining only the first main object as the target object to be synthesized with the second image.

20. The method of claim 15, wherein determining the position for arranging the at least one target object on the second image comprises:
based on correlation for the at least one target object and the at least one background object, determining a plurality of candidate layout areas for arranging the at least one target object;
displaying graphic data indicating the determined candidate layout areas on the second image;
determining one of the candidate layout areas, based on a user input; and
determining the position for arranging the at least one target object on the object based on the determined candidate layout area.

* * * * *